(12) United States Patent
Reisch et al.

(10) Patent No.: US 11,892,066 B2
(45) Date of Patent: Feb. 6, 2024

(54) TRANSMISSION, DRIVE TRAIN AND VEHICLE HAVING A TRANSMISSION

(71) Applicant: ZF Friedrichshafen AG, Friedrichshafen (DE)

(72) Inventors: Matthias Reisch, Ravensburg (DE); Stefan Beck, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/771,691

(22) PCT Filed: Oct. 22, 2020

(86) PCT No.: PCT/EP2020/079810
§ 371 (c)(1),
(2) Date: Mar. 13, 2023

(87) PCT Pub. No.: WO2021/078894
PCT Pub. Date: Apr. 29, 2021

(65) Prior Publication Data
US 2023/0213092 A1 Jul. 6, 2023

(30) Foreign Application Priority Data
Oct. 25, 2019 (DE) .......................... 102019216510.9

(51) Int. Cl.
*F16H 48/34* (2012.01)
*F16H 48/10* (2012.01)
(Continued)

(52) U.S. Cl.
CPC ............. *F16H 48/10* (2013.01); *F16H 48/22* (2013.01); *F16H 48/32* (2013.01); *F16H 48/34* (2013.01);
(Continued)

(58) Field of Classification Search
CPC .......... F16H 48/10; F16H 48/22; F16H 48/32; F16H 48/34; F16H 2048/104;
(Continued)

(56) References Cited

U.S. PATENT DOCUMENTS

| | | | | |
|---|---|---|---|---|
| 2012/0285765 A1* | 11/2012 | Zulu | ...................... | B62D 11/08 180/417 |
| 2020/0276897 A1* | 9/2020 | Pinschmidt | .............. | B60K 1/00 |
| 2022/0397187 A1* | 12/2022 | Beck | ...................... | B60K 17/16 |

FOREIGN PATENT DOCUMENTS

| | | |
|---|---|---|
| DE | 20 2006 017 096 U1 | 2/2007 |
| DE | 10 2008 050 059 A1 | 4/2010 |

(Continued)

OTHER PUBLICATIONS

International Search Report and Written Opinion of the International Search Authority dated Jan. 26, 2021 in International Application No. PCT/EP2020/079810 (English and German languages) (23 pp.).

*Primary Examiner* — Justin Holmes
(74) *Attorney, Agent, or Firm* — Crowell & Moring LLP

(57) ABSTRACT

A transmission may include an input shaft, a first output shaft, a second output shaft, a first planetary gearset, and a second planetary gearset connected to the first planetary gearset. Optionally, the input shaft is connected to a first element of the first planetary gearset for conjoint rotation, the first output shaft is connected to a second element of the first planetary gearset for conjoint rotation, and the second output shaft is connected to a third element of the second planetary gearset for conjoint rotation. A third element of the first planetary gearset may be connected to a first element of the second planetary gearset via a shaft for conjoint rotation, and a second element of the second planetary gearset may be fixed in place on a non-rotating component.

19 Claims, 30 Drawing Sheets

(51) Int. Cl.
*F16H 48/22* (2006.01)
*F16H 48/32* (2012.01)
(52) U.S. Cl.
CPC .. *F16H 2048/104* (2013.01); *F16H 2048/106* (2013.01); *F16H 2200/0021* (2013.01); *F16H 2200/2007* (2013.01)
(58) Field of Classification Search
CPC ....... F16H 2048/106; F16H 2200/0021; F16H 2200/2007; F16H 2200/2035; F16H 2200/2094; F16H 3/54; F16H 2200/0034; F16H 2200/2005; F16H 2200/2064; B60K 17/344; B60K 17/356; B60K 1/00; B60K 2001/001; B60Y 2400/73
See application file for complete search history.

(56) References Cited

FOREIGN PATENT DOCUMENTS

| | | | |
|---|---|---|---|
| DE | 10 2011 079 975 A1 | 1/2013 | |
| DE | 10 2018 112 880 A1 | 12/2018 | |
| DE | 10 2017 212 781 A1 | 1/2019 | |
| WO | WO-2015062599 A2 * | 5/2015 | ........... B60K 17/046 |

* cited by examiner

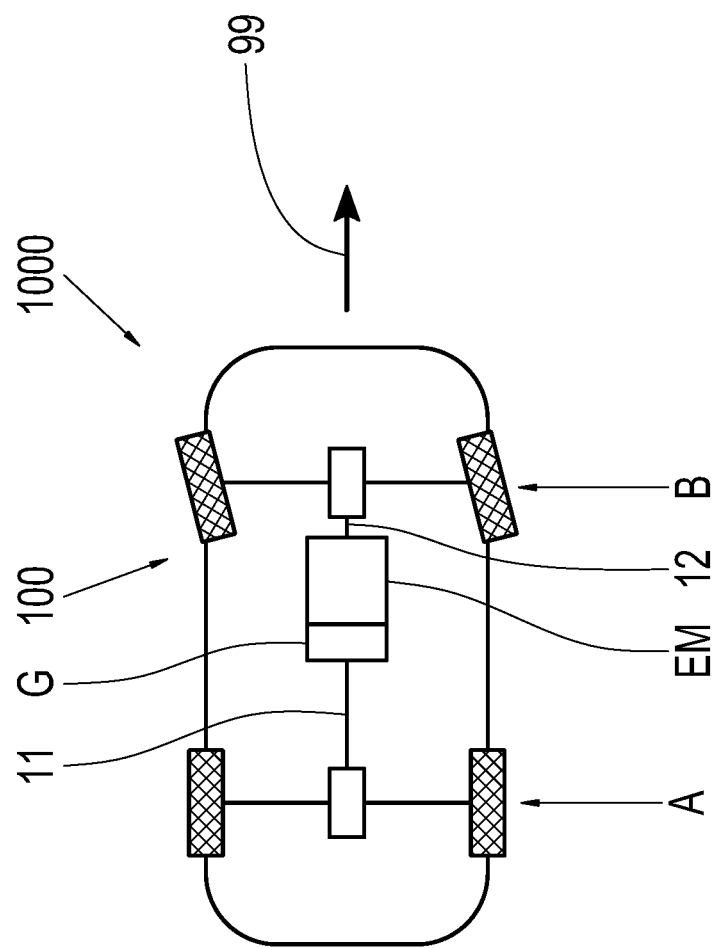

| Figur | P1 | P2 | Calculating rule |
|---|---|---|---|
| 2, 3 | negative | negative | $i_{02} = \dfrac{1}{i_{01}} - 1$ |
| 8 | negative | negative | $i_{02} = \dfrac{1}{i_{01}} - 1$ |
| 9 | negative | negative | $i_{02} = i_{01} - 1$ |
| 4 | positive | negative | $i_{02} = \dfrac{1}{1 - i_{01}} - 1$ |
| 6 | negative | positive | $i_{02} = 2 - \dfrac{1}{i_{01}}$ |
| 5 | positive | positive | $i_{02} = 2 + \dfrac{1}{i_{01} - 1}$ |

Fig. 19

TRANSMISSION, DRIVE TRAIN AND VEHICLE HAVING A TRANSMISSION

RELATED APPLICATIONS

This application is a filing under 35 U.S.C. § 371 of International Patent Application PCT/EP2020/079810, filed Oct. 22, 2020, and claiming priority to German Patent Application 10 2019 216 510.9, filed Oct. 25, 2019. All applications listed in this paragraph are hereby incorporated by reference in their entireties.

TECHNICAL FIELD

The invention relates to a transmission, in particular for a motor vehicle. The invention also relates to a drive train and a vehicle.

BACKGROUND

Transmissions are known from the prior art, e.g. DE 10 2011 079 975 A1, that provide a torque conversion as the ratio of an output torque to an input torque and a gear transmission as the ratio of an input rotational rate to an output rotational rate.

An electric vehicle with an integrated differential is known from DE 10 2018 112 880 A1. The electric vehicle drive system contains an electric motor, first and second planetary gear assemblies, including sun gears, planet carriers, and ring gear elements, first and second output shafts, and a housing. The elements in the first planetary gear assembly are connected to the electric motor, the first output shaft, and an element in the second planetary gear assembly. The elements in the second planetary gear assembly are connected to the first planetary gear assembly, the housing, and the second output shaft. The first planetary gear assembly provides a differential reduction device, and the second planetary gear assembly provides a reversal and reduction device. Optional clutches can provide the function of a slippage limiting differential, and distribute torque to one or the other output shafts.

Such a transmission, also referred to as a rolling differential, does not form a compound torque (e.g. at a differential cage), as is otherwise normal in the prior art. The prevention of the formation of a compound torque means that the combined individual torque of the two output shafts is not applied to any of the rotating components, e.g. the input shafts, output shafts, or elements of the planetary gearsets.

Vehicle differentials frequently require a blocking effect. If, for example, a driven wheel in a vehicle with an open differential loses contact to the ground, and is therefore suspended in the air, the drive torque at this wheel is then zero. Assuming that inertia forces are disregarded, then with a differential without a blocking effect, the torque at the other wheel on the same axle must also be zero. Consequently, it is no longer possible to propel the vehicle.

So-called limited-slip differentials allow torque to be transferred to the wheel still in contact with the ground if the other wheel or axle loses traction. This can take place in a form-fitting or frictionally engaged manner. With known beveled gear differentials and spur-gear differentials there is a direct coupling between one of the output shafts and the differential cage.

A differential lock is known from DE 20 2006 017 096 U1 in which a multi-disk clutch acts between the differential cage and an output shaft. The actuation takes place via the pressure piston, non-rotationally connected to the housing, and the axial bearing. The return of the actuation force takes place via the tapered roller bearing on the right.

BRIEF DESCRIPTION OF THE DRAWINGS

Certain embodiments are explained below with reference to the figures. Therein:

FIGS. 1a-1e show a schematic view of a motor vehicle drive train;

FIG. 19 shows an overview of the standard transmission gear ratios for the individual embodiments;

DETAILED DESCRIPTION

Figure 1A:
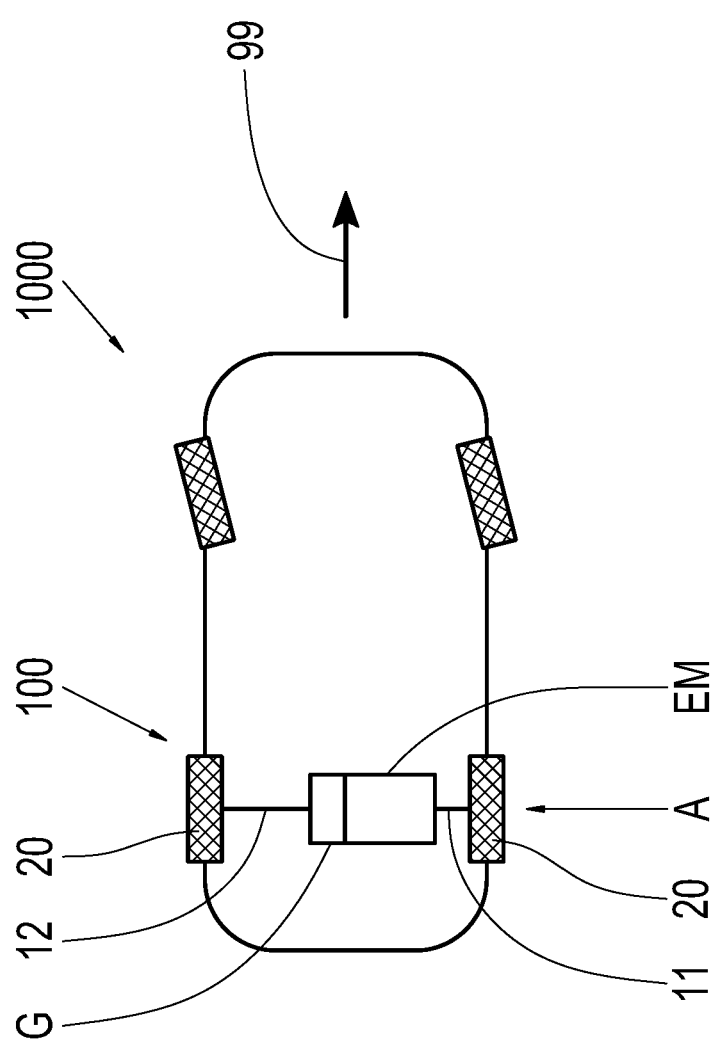

An object of the present invention is to improve the known integrated differential, in particular to provide a locking torque for the known integrated differential, in order to improve traction and vehicle handling.

In one aspect, the invention is based on a transmission comprising an input shaft, a first output shaft, a second output shaft, a first planetary gearset, and a second planetary gearset connected to the first planetary gearset, wherein the planetary gearsets each comprise numerous elements, wherein the input shaft is connected to a first element in the first planetary gearset for conjoint rotation therewith, the second output shaft is connected to a third element in the second planetary gearset for conjoint rotation therewith, a third element in the first planetary gearset is connected to a first element in the second planetary gearset via a shaft for conjoint rotation therewith, and a second element in the second planetary gearset is secured to a non-rotating component.

The transmission is distinguished in that there is a shifting element that is disposed and designed to connect the two output shafts such that they can transfer torques and in particular are not connected for conjoint rotation, such that a torque applied to one of the two output shafts is conducted radially outside the shifting element.

A torque-transferring connection does not require the two output shafts to be connected for conjoint rotation. It is therefore preferred in particular that the torque-transferring connection have slippage. A slipping or sliding shifting element, in particular, can therefore be provided for such a transference. In an operating situation, the torque, which cannot be applied to the road surface with a wheel that is rotating more quickly, for example, can be conducted via a sliding shifting element to the slower wheel, which has traction.

It is preferred in particular that the connection of the third element in the second planetary gearset on the second output shaft encompasses the shifting element. This connection can be in the form of a shaft, for example.

As a result, the torque at the third element in the second planetary gearset in particular can be conducted radially outside the shifting element to the second output shaft.

With this transmission, the torque conversion and the torque distribution can be applied to the output shafts through a bracing against the housing. Furthermore, locking function can also be provided.

The placement of the shifting element according to the invention—in particular in comparison with transmissions known from the prior art, in which the torque is conducted axially to the output shaft, next to the shifting element—makes it possible to obtain a transmission that is very short in the axial direction.

"shaft" is understood to be a rotating component in the transmission, via which components of the transmission belonging thereto are connected for conjoint rotation, or via which such a connection is obtained when a corresponding shifting element is actuated. The respective shafts can connect these components axially or radially, or both axially and radially. As a result, the respective shaft can also form an intermediate part, via which a respective component is connected radially thereto, for example.

The elements are in the form of a sun gear, planet carrier, and ring gear, in particular.

erein, "axial" refers to an orientation along a longitudinal central axis, along which the planetary gearsets are arranged coaxial to one another. "Radial" then refers to an orientation along the direction of the diameter of a shaft lying on this longitudinal central axis.

If an element is secured in place it cannot rotate. The non-rotating components in the transmission can be stationary components, e.g. a housing for the transmission, part of such a housing, or a non-rotating component connected thereto.

Regarding torque-conversion of the transmission: the transmission has two output shafts, the combined torques of which describe the conversion of the transmission in relation to the input torque. The gear ratios of the respective output shafts are not yet defined. Firstly, the coupling of the two output shafts, e.g. via the wheels of the vehicle on the road surface, generates defined rotational rates. If both output shafts rotate at the same rate, as is the case when driving along a straight trajectory, for example, the gear ratio can be formed, as with the prior art, as the rotational rate ratio between the input rotational rate and one of the two identical output rotational rates. In all other cases, it is not possible to call the gear ratio a gear ratio of the transmission with the current definition.

The first and second planetary gearsets can be axially adjacent to one another. The first planetary gearset can also be placed radially inside the second planetary gearset, however. The latter is also referred to as a nested assembly. Conducting the torque outside makes it possible, in conjunction with the stacked planetary gearsets, to keep the transmission axially short to a large extent.

The teeth of the two elements of the first and second planetary gearsets that are connected to one another, i.e. the third element of the first planetary gearset and the first element of the second planetary gearset, are preferably formed on the same component.

The pitches of the teeth on the third element in the first planetary gearset and on the first element in the second planetary gearset are preferably identical, and in the same direction. The identical pitches free the connecting components or coupling shafts of axial forces, such that there is no need for a complex axial bearing.

A slope or thread pitch of a helical gearing is understood to be the axial path measured along an associated rotational axis that is required in the case of a theoretical continuation of a tooth over the actual width of the gearwheel to obtain a 360° encircling of the tooth about the axis. In the case of threadings, the term thread pitch is used analogously. A gearwheel with numerous helical teeth is therefore comparable to a multiple threading. In the case of spindles, the term pitch is also used for the corresponding value.

The input shaft is preferably connected to a drive machine, in particular an electric machine or an internal combustion engine, in order to introduce a torque in the transmission. With an electric machine, the rotor of the electric machine is preferably connected to the input shaft for conjoint rotation therewith. The rotor is preferably connected to the input shaft via at least one transmission stage.

The axis of the electric machine can be either coaxial to the planetary gearsets or parallel thereto. In the first case, the rotor in the electric machine can either be connected directly to the input shaft for conjoint rotation, or it can be coupled thereto via one or more intermediate transmission stages, wherein the latter case enables a more effective design of the electric machine with higher rotational rates and lower torque. The at least one transmission stage can be in the form of a spur gear stage and/or planetary gear stage.

If the electric machine is axially offset to the planetary gearsets, it is coupled thereto via one or more intermediate transmission stages and/or a traction drive. The one or more transmission stages can also be implemented individually as spur gear stages or planetary gear stages. A traction drive can either be a belt drive or a chain drive.

If the electric machine is coaxial, the first output shaft preferably passes through the rotor in the electric machine. This results in a particularly compact construction of the electric machine and the transmission.

The standard transmission gear ratio for the second planetary gearset is preferably calculated, at least approximately, from the inverse of the standard transmission gear ration for the first planetary gearset minus 1, i.e.: $i\_02=1/i\_01-1$.

If both planetary gearsets are negative planetary gearsets (e.g. according to FIG. 2 or 3), this calculation rule results in a respective halved distribution of the drive torque to the two output shafts, if the transmission losses are disregarded. This is of particular advantage when the invention is used to distribute the torque to two wheels on the same axle.

If another torque distribution is desired, or the planetary gearsets have a different design (e.g. FIGS. 4 to 9), a calculation rule can be defined in an analogous manner (FIG. 19). The reason for using the phrase, "at least approximately," is because the asymmetrical transmission losses to the two output shafts in operation under real conditions may result in a slight deviation from the calculating rule, which is advantageous in obtaining equal output torques at both shafts. Furthermore, this wording is used because a precise maintaining of the calculation rule while maintaining whole number tooth numbers and efficient tooth number combinations, e.g. with regard to acoustic requirements, is not always possible.

The number of planets in the second planetary gearset is preferably larger than the number of planets in the first planetary gearset. This configuration allows for a large transmission gear ratio, despite use of the above calculation rule, which in turn results in a particularly compact and cost-effective electric machine. The second planetary gearset preferably has six planets and the first planetary gearset preferably has three or four planets. As a matter of course, the number of planet gears in the second planetary gearset can also be greater than that in the first planetary gearset without using the calculation rule.

The drive machine is preferably installed transverse to the direction of travel. The two output shafts are preferably connected to the wheels of the vehicle for conjoint rotation therewith.

The two output shafts preferably distribute the torque that is input to different axles on the vehicle. This allows for an assembly in the form of a longitudinal distributer transmission (also referred to as a longitudinal distributer), i.e. a transmission, that distributes the torque that is input to numerous axles, in particular a front axle and a rear axle of the vehicle.

The torque distribution to the output shafts by the transmission does not need to be uniform. In particular with the embodiment as a longitudinal distribution transmission, the distribution to the different axles can be non-uniform. By way of example, the torque provided by the input shaft can be distributed such that 60% is conducted to the rear axle, and 40% is conducted to the front axle.

The two planetary gearsets can be designed as negative or positive planetary gearsets. A combination of negative and positive planetary gearsets can also be used.

A negative planetary gearset is comprised, in the manner known in principle to the person skilled in the art, of a sun gear, planet carrier, and ring gear, wherein the planet carrier guides at least one, preferably numerous, rotating planet gears, each of which meshes with both the sun gear and the encompassing ring gear.

A positive planetary gearset likewise comprises a sun gear, ring gear, and planet carrier, wherein the latter guides at least two planet gears, one of which meshes with the internal sun gear, and the other of which meshes with the surrounding ring gear, while the two planet gears also mesh with one another.

Where it is possible to connect the individual elements, a negative planetary gearset can be converted to a positive planetary gearset, wherein, in comparison with the embodiment as a negative planetary gearset, the ring gear and the planet carrier connections are exchanged, and the value for the transmission gear ratio is increased by a value of one. A positive planetary gearset can also be replaced by a negative planetary gearset, as long as the connecting of the elements in the transmission allows for this. In this case, in comparison with the positive planetary gearset, the ring gear and planet carrier connections are likewise exchanged, and the transmission gear ratio is reduced by a value of one, thus changing the sign. In the framework of the invention, however, the two planetary gearsets are preferably negative planetary gearsets.

Both planetary gearsets are preferably negative planetary gearsets. These are efficient and can be placed axially adjacent to one another, and nested radially.

If negative and positive planetary gearsets are combined in a nested arrangement, the radially inner planetary gearset is preferably a negative planetary gearset, and the radially outer planetary gearset is preferably a positive planetary gearset. This makes it easy to nest them. Furthermore, the fixed ring gear has the advantage in this context that the (normally) less efficient positive planetary gearset only acts on one output shaft.

There can also be an additional step-up transmission or multi-gear transmission, preferably a 2-gear transmission, upstream of the transmission in the framework of the invention. This step-up transmission or multi-gear transmission can then also be part of the transmission, and is used for the configuration of an additional gear ratio, in that the rotational rate of the drive machine is converted, for example, and the input shaft is powered with this converted rotational rate. The multi-gear transmission or step-up transmission can be in the form of a planetary transmission, in particular.

The elements of the transmission can preferably be described as follows:
  a) A transmission with two negative planetary gearsets, wherein the first element of the first planetary gearset is a sun gear, the second element of the first planetary gearset is a planet carrier, and the third element of the first planetary gearset is a ring gear, and wherein
  the first element of the second planetary gearset is a sun gear, the second element of the second planetary gearset is a planet carrier, and the third element of the second planetary gearset is a ring gear.

This transmission can be referred to as a first concept, with two negative planetary gearsets.
  b) A transmission with two negative planetary gearsets, wherein the first element of the first planetary gearset is a sun gear, the second element of the first planetary gearset is a ring gear, and the third element of the first planetary gearset is a planet carrier, and wherein
  the first element of the second planetary gearset is a ring gear, the second element of the second planetary gearset is a planet carrier, and the third element of the second planetary gearset is a sun gear.

This transmission can be referred to as a second concept, with two negative planetary gearsets.
  c) A transmission with two negative planetary gearsets, wherein
  the first element of the first planetary gearset is a ring gear, the second element of the first planetary gearset is a planet carrier, and the third element of the first planetary gearset is a sun gear and wherein
  the first element of the second planetary gearset is a sun gear,
  the second element of the second planetary gearset is a planet carrier, and
  the third element of the second planetary gearset is a ring gear.

This transmission can be referred to as a fifth concept, with two negative planetary gearsets.
  d) A transmission with one positive and one negative planetary gearset, wherein the second planetary gearset is the negative planetary gearset, wherein
  the first element of the first planetary gearset is a sun gear,
  the second element of the first planetary gearset is a ring gear, and
  the third element of the first planetary gearset is a planet carrier and wherein
  the first element of the second planetary gearset is a sun gear,
  the second element of the second planetary gearset is a planet carrier, and the third element of the second planetary gearset is a ring gear.

This transmission is basically the first concept with a positive planetary gearset.

e) A transmission with one positive and one negative planetary gearset, wherein the first planetary gearset is the negative planetary gearset, wherein the first element of the first planetary gearset is a sun gear, the second element of the first planetary gearset is a planet carrier, and the third element of the first planetary gearset is a ring gear and wherein the first element of the second planetary gearset is a sun gear, the second element of the second planetary gearset (P2) is a ring gear, and the third element of the second planetary gearset is a planet carrier.

This transmission is basically the first concept with a positive planetary gearset.

f) A transmission with two positive planetary gearsets, wherein the first element of the first planetary gearset is a sun gear, the second element of the first planetary gearset is a ring gear, and the third element of the first planetary gearset is a planet carrier, and wherein the first element of the second planetary gearset is a sun gear, the second element of the second planetary gearset is a ring gear, and the third element of the second planetary gearset is a planet carrier.

This transmission is basically the first concept with two positive planetary gearsets.

The shifting element is preferably a clutch, preferably a friction clutch, a dog clutch, or a synchronization. An axial floating bearing with at least two corresponding friction surfaces is also understood as a clutch and therefore a shifting element in this context. The friction surfaces of a friction clutch can be planar or conical, for example.

The shifting element is preferably at least partially located radially inside the third element of the second planetary gearset or its connection to the second output shaft, i.e. radially inside the ring gear, if the third element is a ring gear.

There is an actuator for actuating the shifting element. This can be a hydraulic or electro-mechanical actuator.

There is therefore preferably an actuator designed as a hydraulic piston for actuating the shifting element. The hydraulic piston is preferably designed as an integral part of the transmission housing or as an integral part of one of the two second elements. The hydraulic cylinder can preferably rotate conjointly with one of the two output shafts. The hydraulic fluid for actuating the hydraulic cylinder can preferably flow through a component that rotates with the output shaft. The hydraulic fluid for actuating the hydraulic cylinder can preferably flow through a hole in one of the two second elements.

Alternatively, there is preferably an electro-mechanical actuator for actuating the shifting element. The electro-mechanical actuator preferably comprises a spindle or a ramp. The electro-mechanical actuator preferably comprises a lever.

The means for actuating the shifting element is preferably configured such that an axial force is transferred through one of the two second elements.

The second element of one of the two planetary gearsets is preferably configured to transfer the axial force such that it is axially displaced.

There is preferably a component that is configured to transfer the axial force that guides the axial force through one of the two second elements.

The shifting element is preferably a friction clutch and is configured to transfer not only the actuator force, but also forces from a helical gearing.

There is preferably a bearing for introducing forces from a gearing into the housing, which also functions as a reaction bearing for bracing the axial forces applied to the meshing bearing in the shifting element.

There is preferably a conjointly rotating means for force conversion, which reduces bearing forces when actuating the shifting element, preferably a slotted plate spring, which is preferably normally disengaged. "Normally disengaged" means that the spring first produces a force-fitting connection when it is actuated. When the shifting element is not actuated, the connection is disengaged.

The input shaft and/or the first element in the first planetary gearset is preferably supported in a floating manner.

The second element in the first planetary gearset and/or the third element in the second planetary gearset is preferably supported in a floating manner.

With a floating bearing, there are a few tenths of a millimeter of play in the axial direction, i.e. the shaft is not clearly secured or fixed in place axially. As a result, the meshing forces can be readily guided toward the friction element. Floating bearings are also more cost-effective, less complicated, and allow for an expansion of the shaft within the range of play, which may be caused by changes in temperature.

The transmission is part of a motor vehicle drive train for a hybrid or electric vehicle, in particular, and is then located between a drive machine of the motor vehicle, in the form of an internal combustion engine or an electric machine, and the subsequent components of the drive train in the direction of the flow of force toward the drive wheels of the motor vehicle. The transmission can also be part of the drive train for a conventional motor vehicle, i.e. a vehicle that is powered simply by an internal combustion engine.

That two components of the transmission are "connected" or "coupled" for "conjoint rotation" means, as set forth in the invention, that these components are permanently coupled to one another, such that they cannot rotate independently of one another. In this regard, there is no shifting element between these components, which can be elements of the planetary gearsets and/or shafts, and/or a non-rotating component of the transmission, and instead, these components are permanently coupled to one another. An elastic connection for conjoint rotation between two components is also understood to result in conjoint rotation. A connection for conjoint rotation can also contain joints, e.g. enabling a hinged movement or compression stroke for a wheel.

On the whole, the invention results in a transmission and a vehicle that has such a transmission, exhibiting an integral construction, i.e. a torque conversion and torque distribution and a compact and axially short construction (in particular with a nested assembly). Furthermore, the transmission is distinguished by a high level of efficiency and low costs due to a low level of complexity. There are significantly lower meshing forces. Gear stripping problems are also reduced. Furthermore, the invention results in an advantageous locking value.

The invention is not limited to the combinations of features given in the independent claims or the dependent claims. There are other possible combinations of individual features that can be derived from the claims, the following description of preferred embodiments of the invention, or directly from the drawings. References in the claims to the drawings through the use of reference symbols are not intended to limit the scope of protection of the claims.

he drive train 100 in FIG. 1a has an electric drive that powers the rear axle A of the vehicle 1000. The drive train comprises a transmission G, which distributes the drive torque from the electric machine EM to two output shafts 11 and 12. The transmission G and the electric machine are contained in the same housing. The forward direction of travel is indicated by the arrow 99. As can also be seen in FIG. 1a, the transmission G and the electric machine EM are transverse to the vehicle's direction of travel.

Figure 1B:
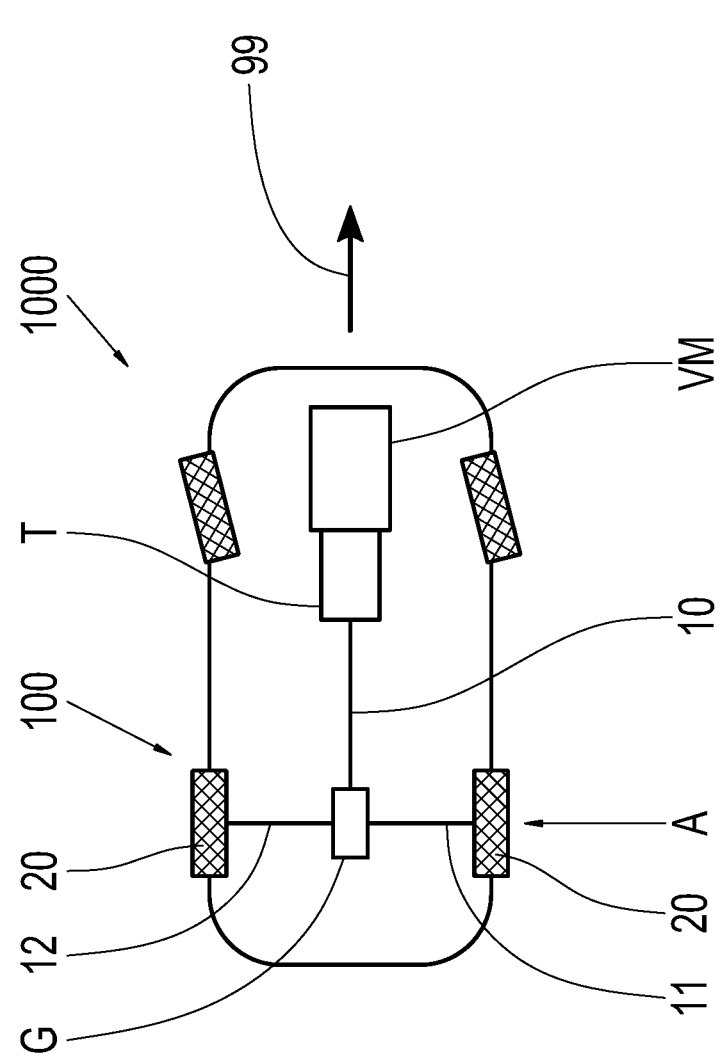

The drive train 100 according to FIG. 1b has an internal combustion engine that powers the rear axle A of the vehicle 1000. The drive train comprises a transmission G, which distributes the drive torque from the internal combustion engine VM to two output shafts 11 and 12, wherein there is another transmission between the transmission G and the internal combustion engine VM, e.g. an automatic transmission for the vehicle. The forward direction of travel is indicated by the arrow 99. As can also be seen in FIG. 1b, the transmission G and the internal combustion engine VM are oriented longitudinally to the vehicle's direction of travel.

Figure 1C:
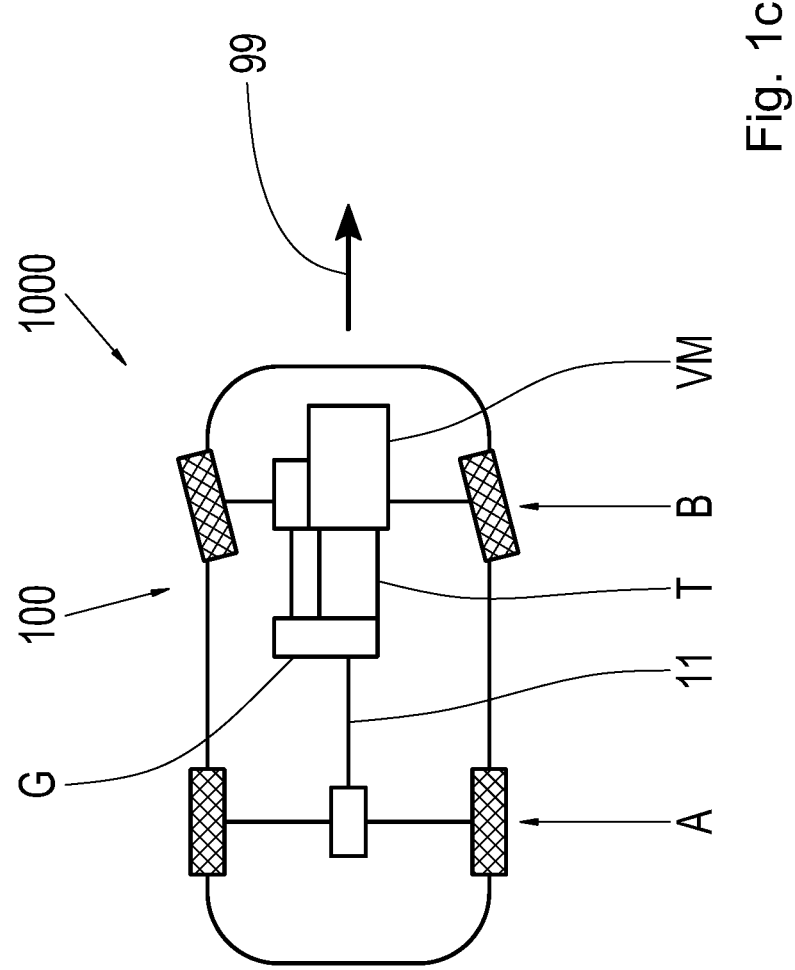

The drive train 100 according to FIG. 1c has an internal combustion engine that powers the rear axle A and the front axle B of the vehicle 1000. The drive train comprises a transmission G, which distributes the drive torque from the internal combustion engine VM to the axles A and B, and there is another transmission between the transmission G and the internal combustion engine VM, e.g. an automatic transmission, for the vehicle. The transmission G can then be connected to the rear axle A via an output shaft 11 that has an axle differential, and to the front axle B via an output shaft 12 that has an axle differential. The forward direction of travel is indicated by the arrow 99. As can also be seen in FIG. 1c, the transmission G and the internal combustion engine VM are oriented longitudinally to the vehicle's direction of travel.

Figure 1D:
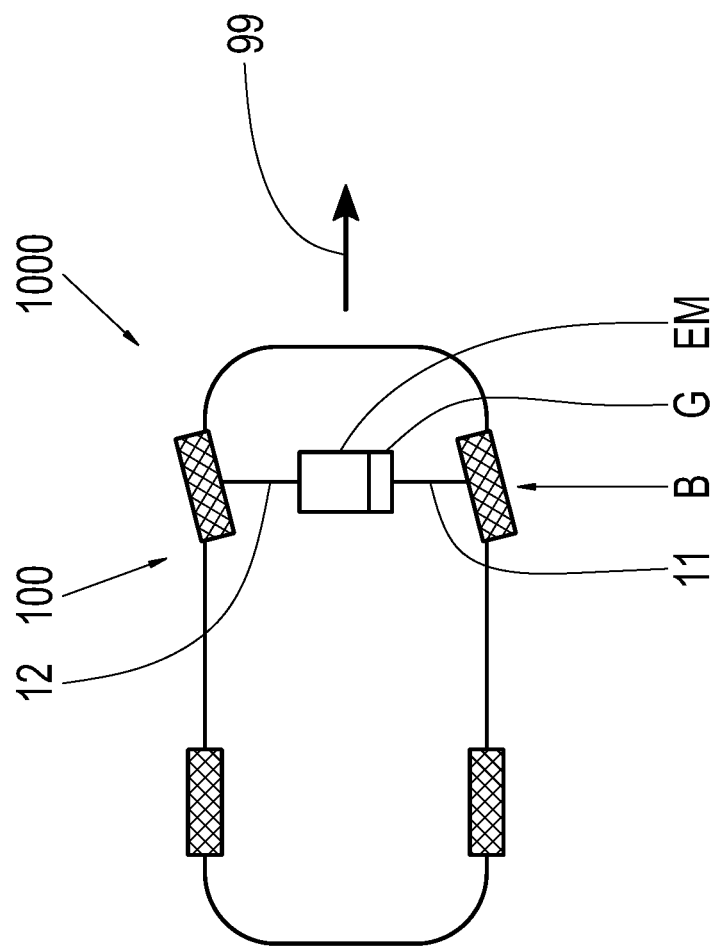

The drive train 100 according to FIG. 1d has an electric drive that powers the front axle B of the vehicle 1000, i.e. an electric front-transverse drive. The drive train comprises a transmission G, which distributes the drive torque from the electric machine EM to two output shafts 11 and 12. The transmission G and the electric machine are contained in the same housing. The forward direction of travel is indicated by the arrow 99. As can also be seen in FIG. 1d, the transmission G and the electric machine EM are oriented transverse to the direction of travel for the vehicle.

The drive train 100 according to FIG. 1e has an electric all-wheel drive that powers both the rear axle A and the front axle B of the vehicle 1000. This is a transmission designed as a longitudinal distributer. The drive train comprises a transmission G, which distributes the drive torque from the electric machine EM to two output shafts 11 and 12. The output shaft 11 transfers the torque to the front axle B, and the output shaft 12 transfers the torque to the rear axle A. The respective torques are then input into respective axle differentials. The transmission G and the electric machine are contained in the same housing. The forward direction of travel is indicated by the arrow 99. As can also be seen in FIG. 1e, the transmission G and the electric machine EM are oriented transverse to the vehicle's direction of travel.

The subsequent FIGS. 2 to 14 show numerous preferred embodiments of transmissions. The shifting element 40 according to the invention, which is disposed and designed to join the two output shafts 11, 12 for conjoint rotation, such that a torque to one of the two output shafts 11, 12 is guided radially outside the shifting element, is present in these figures, but not illustrated. The shifting element 40 shall be explained in greater detail below in reference to FIGS. 20 to 27.

Figure 2:
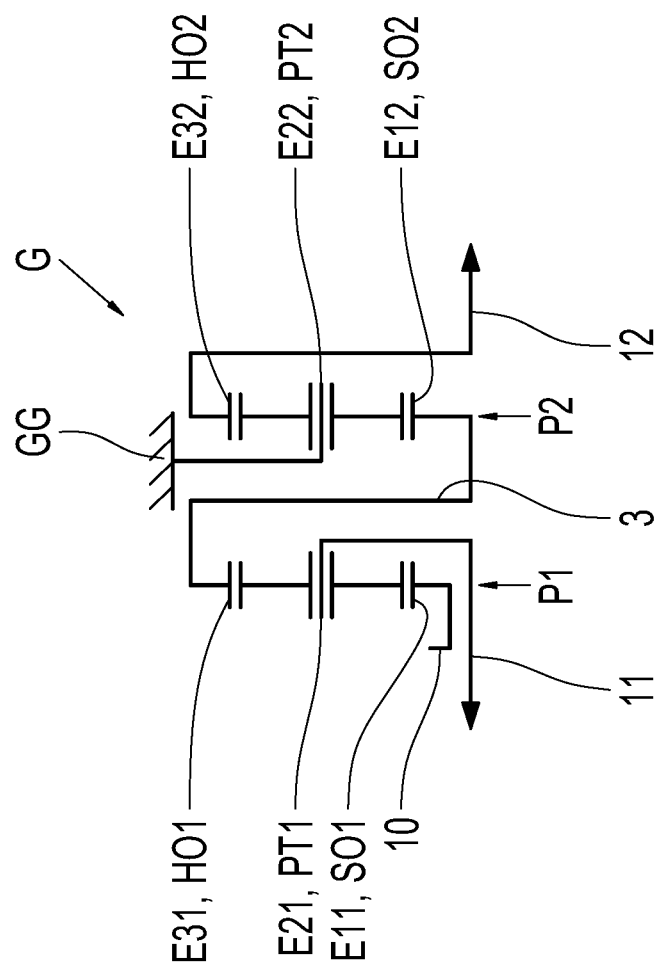
FIGS. 2-5 each show a schematic view of a transmission as it can be used in the motor vehicle drive train shown in FIG. 1, in each case in a preferred embodiment.

FIG. 2 shows a transmission G in a first preferred embodiment. The transmission G comprises an input shaft 10, a first output shaft 11, a second output shaft 12, a first planetary gearset P1, and a second planetary gearset P2, which is connected to the first planetary gearset P1. The planetary gearsets P1 and P2 are each designed as negative planetary gearsets in the present case. The planetary gearsets P1, P2 each comprise numerous elements E11, E21, E31, E12, E22, E32, wherein the first element E11 is a sun gear S01, the second element E21 is a planet carrier PT1, and the third element E31 of the first planetary gearset P1 is a ring gear HO1. In the second planetary gearset P2, the first element E12 is a sun gear SO2, the second element E22 is a planet carrier PT2, and the third element E32 is a ring gear HO2. The planet carriers PT1, PT2 each support numerous planet gears, which are illustrated but not provided with reference numbers. The planet gears mesh with the respective radially inward sun gear and the respective encircling ring gear.

The input shaft 10 in the present case is joined to the first element E11 for conjoint rotation. The first output shaft 11 is joined to the second element E21 of the first planetary gearset for conjoint rotation. The second output shaft 12 is joined to the third element E32 of the second planetary gearset for conjoint rotation. The third element E31 of the first planetary gearset P1 is joined to the first element E12 of the second planetary gearset P2 for conjoint rotation, while the second element E22 of the second planetary gearset P2 is secured to a non-rotating component GG. The non-rotating component GG is a transmission housing for the transmission G.

The third element E31, i.e. the ring gear HO1 in the first planetary gearset P1 and the first element E12, i.e. the sun gear SO2 in the second planetary gearset, collectively form a component that is a shaft 3 in the present case.

As can be seen in FIG. 2, the input shaft 10, first output shaft 11, and second output shaft 12 are coaxial to one another. The two planetary gearsets P1, P2 are also coaxial to one another. The two planetary gearsets P1, P2 are spaced apart axially in this embodiment.

The input shaft 10 can be connected to a drive machine and thus input an input torque to the transmission G. This means that the input shaft and output shafts rotate in the same direction. By connecting the two planetary gearsets P1, P2 to one another, and supporting the second element E22 on the housing GG, an input torque can be distributed to the two output shafts 11, 12. In this case, the transmission assumes not only the function of a gear ratio transmission, but also that of a differential transmission. This means that the input torque is not only converted, but also distributed to different output shafts. The direction of rotation is not reversed in this embodiment.

Figure 3:
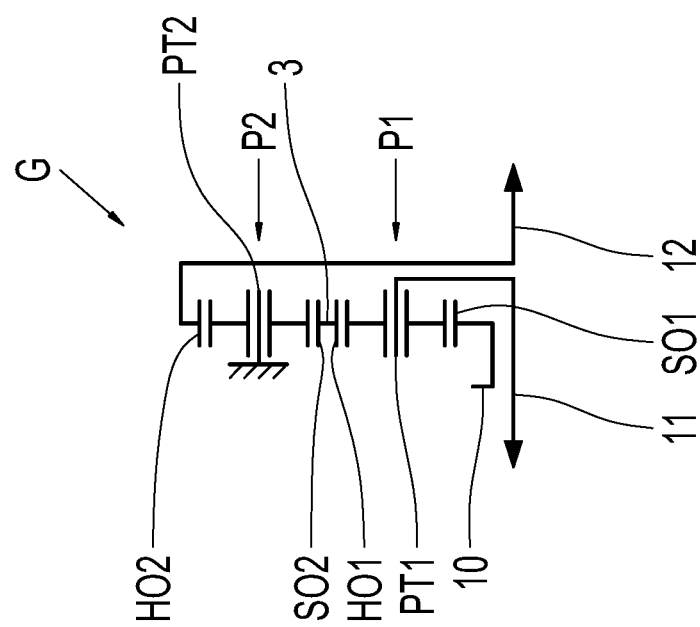

FIG. 3 shows another preferred embodiment of the transmission G. Unlike the embodiment in FIG. 2, the embodiment in FIG. 3 has a radially nested arrangement of the two planetary gearsets P1, P2. While the embodiment in FIG. 2 proposes an extremely radially compact construction, the embodiment in FIG. 3 enables an extremely axially compact construction for the transmission G. The first planetary gearset P1 forms the radially inner planetary gearset in this case. The second planetary gearset P2 forms the radially outer planetary gearset. The first planetary gearset P1 is therefore radially inside the second planetary gearset P2. The connection of the first ring gear HO1 in the first planetary gearset P1 to the sun gear SO2 in the second planetary gearset is also in the form of a single component in this embodiment, which is likewise in the form of a shaft 3 in this case. The direction of rotation is also not reversed in this embodiment.

Figure 4:
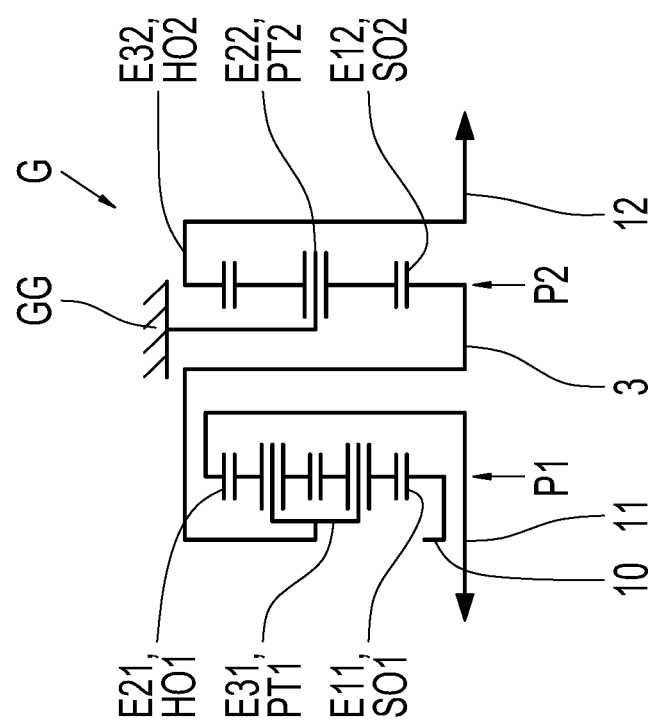

FIG. 4 shows another preferred embodiment of a transmission G. Unlike in FIG. 2, the first planetary gearset P1 is a positive planetary gearset in this case. This means that the third element E31 of the first planetary gearset is in the form of a planet carrier, which is connected to the first element E12 in the second planetary gearset, i.e. the sun gear SO2, for conjoint rotation. The second element E21 then forms a ring gear HO1, and is connected to the first output shaft 11 for conjoint rotation therewith. The third element E31 in the first planetary gearset and the first element E12 in the second planetary gearset are then formed on the same component, which is a shaft 3 in this case. Otherwise, reference is made to the explanations regarding FIG. 2.

Figure 5:
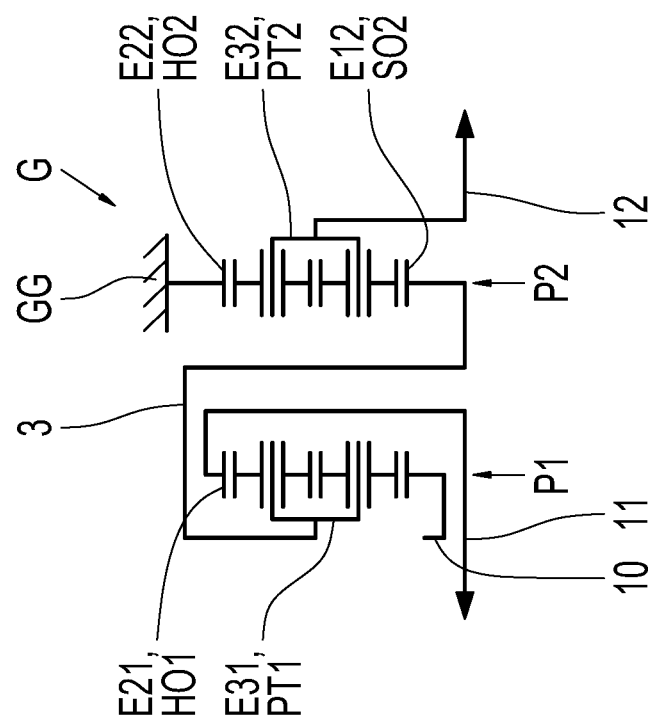

FIG. 5 shows another preferred embodiment of the transmission G. Unlike the embodiment in FIG. 2, both planetary gearsets P1, P2 are now positive planetary gearsets. As such, the second element E21 is a ring gear HO1, and it is connected to the first output shaft 11 for conjoint rotation. The third element E31 is a planet carrier PT1 therein, and connected to the first element E12, i.e. the sun gear SO2 in the second planetary gearset P2, for conjoint rotation therewith. The second element E222 in the second planetary gearset P2 is now the ring gear HO2, and secured to the non-rotational component GG. The third element E32 in the second planetary gearset P2 forms the planet carrier PT2, and is joined to the second output shaft 12 for conjoint rotation.

In this case, the planet carrier and ring gear connections are exchanged in both planetary gearsets P1, P2. Otherwise, reference is made to the explanations regarding FIG. 2.

Figure 6:
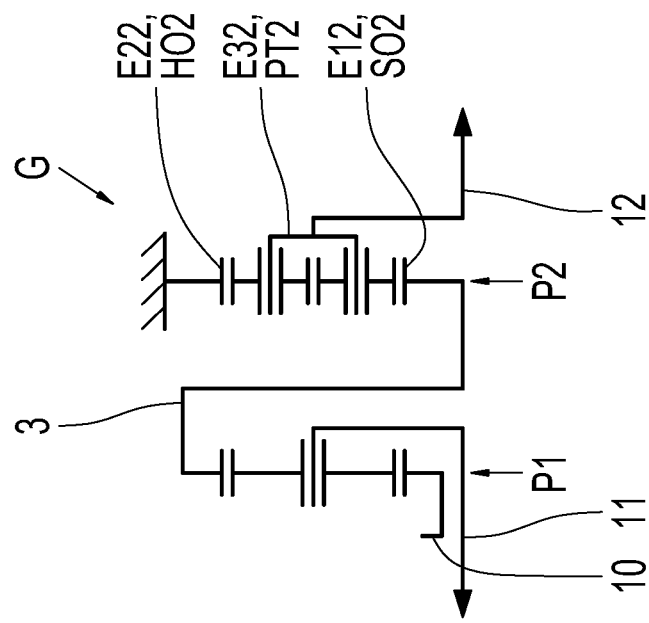
FIG. 6 shows a schematic view of a transmission as it can be used in the motor vehicle drive train shown in FIG. 1, in a preferred embodiment.

FIG. 6 shows a transmission in another preferred embodiment. Unlike the embodiment in FIG. 2, the second planetary gearset P2 is now a positive planetary gearset, while the first planetary gearset P1 remains the same. The ring gear HO2 in the second planetary gearset P2 is therefore secured to the housing GG. Furthermore, the planet carrier PT2 is connected to the second output shaft 12 for conjoint rotation. The planet carrier and ring gear connections are therefore exchanged in the second planetary gearset. Otherwise, reference is made to the explanations regarding FIG. 2.

Figure 7:
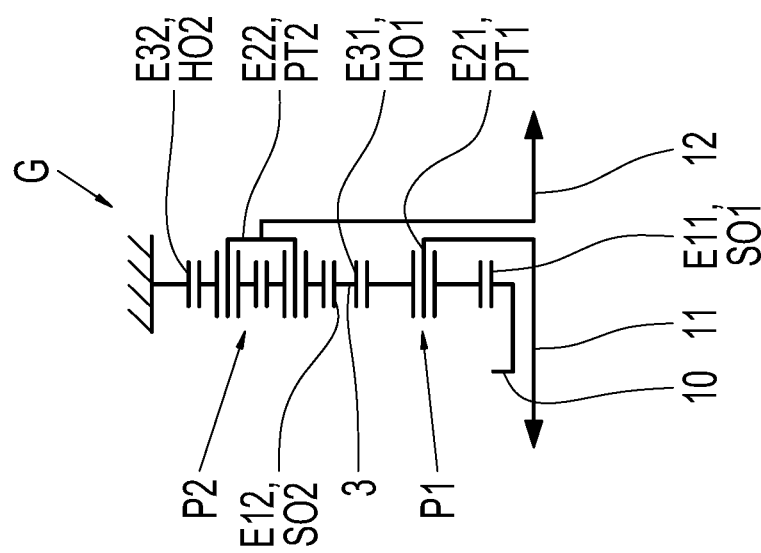
FIGS. 7-9 each show a schematic view of a transmission as it can be used in the motor vehicle drive train shown in FIG. 1, in each case in a preferred embodiment.

FIG. 7 shows another preferred embodiment of the transmission G. Unlike the embodiment in FIG. 6, the embodiment in FIG. 7 has radially nested planetary gearsets P1, P2. The radially inner planetary gearset is the first planetary gearset P1. The radially outer planetary gearset is the second planetary gearset P2. Otherwise, reference is made to the explanations regarding FIG. 6 and FIG. 2.

Figure 8:
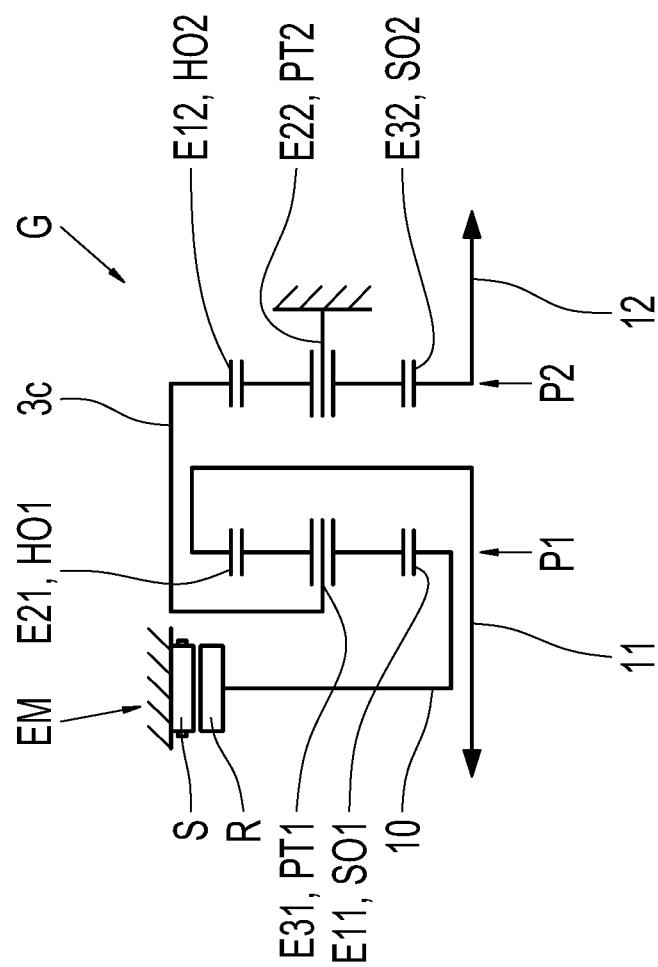

FIG. 8 shows the transmission G in another preferred embodiment. This embodiment has the following differences to the embodiment shown in FIG. 2: First, the drive machine is in the form of an electric machine EM. The electric machine EM comprises a stator S and a rotor R in a housing. The rotor R is connected to the first element E11, i.e. the sun gear SO1 in the first planetary gearset, for conjoint rotation. Moreover, the second element E21 in the first planetary gearset is a ring gear HO1, and is connected to the first output shaft 11 for conjoint rotation. Furthermore, the third element E31 of the first planetary gearset P1 is a planet carrier PT1, and connected to the first element E12 in the second planetary gearset P2, which in this case is a ring gear HO2, for conjoint rotation. The second element E22 in the second planetary gearset is a planet carrier PT2, and fixed in place on the housing GG. The third element E32 is a sun gear SO2, and connected to the second output shaft for conjoint rotation. The input rotational rate is inverted in this preferred embodiment. It is not possible to nest the planetary gearsets P1, P2 in this embodiment.

In other words, the torque is introduced via the sun gear SO1 in the first planetary gearset P1, but the drive is obtained via the ring gear HO1. Unlike in FIG. 2, the planet carrier in the first planetary gearset P1 is now connected to the ring gear HO2 in the second planetary gearset for conjoint rotation therewith. In differing from the embodiment in FIG. 2, the second planetary gearset is therefore powered via the sun gear SO2.

Figure 9:
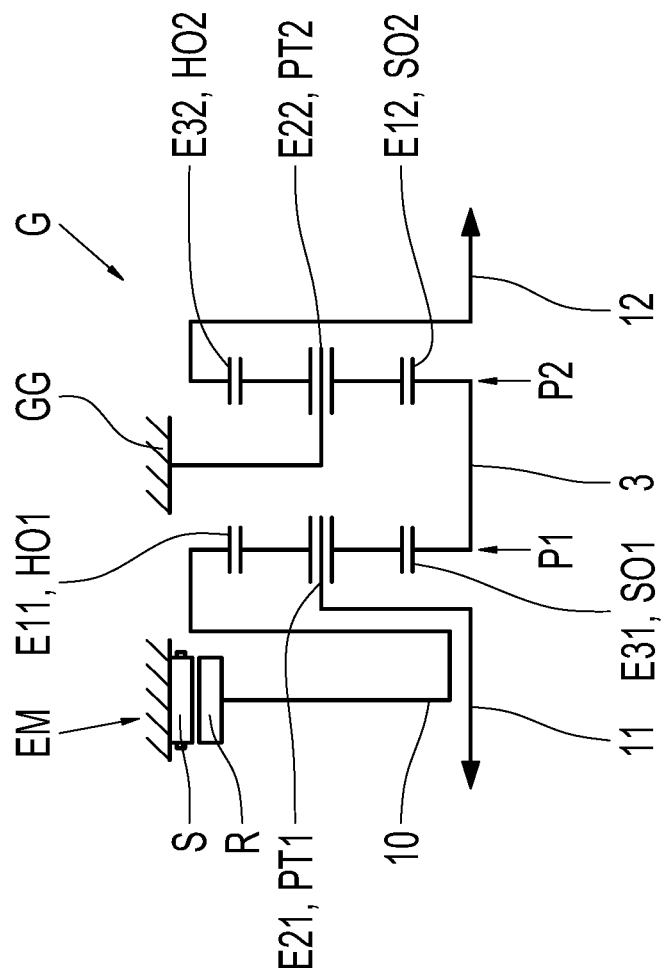

FIG. 9 shows another preferred embodiment of the transmission G. The embodiment exhibits the following differences to the embodiment in FIG. 2: First, there is a drive machine in the form of an electric machine EM, which has a stator S and rotor R in a housing. The rotor R is connected to the input shaft 10 for conjoint rotation, which in turn is connected to the first element E11, presently in the form of a ring gear HO1, in the first planetary gearset P1. The first output shaft 11 is connected to the second element E21, presently in the form of a planet carrier PT2, in the first planetary gearset P1. The third element E31 in the first planetary gearset P1, presently in the form of a sun gear SO1, is connected to the first element E12, i.e. the sun gear SO2 in the second planetary gearset, for conjoint rotation. The other elements in the second planetary gearset remain unchanged.

Unlike in the embodiment in FIG. 2, the torque is introduced via the ring gear HO1 in the first planetary gearset P1 in the embodiment shown in FIG. 9, while the first planetary gearset P1 continues to be powered via the planet carrier PT1. Unlike in FIG. 2, the two planetary gearsets P1, P2 are connected by a common sun gear, presently in the form of a shaft 3.

Figure 9A:
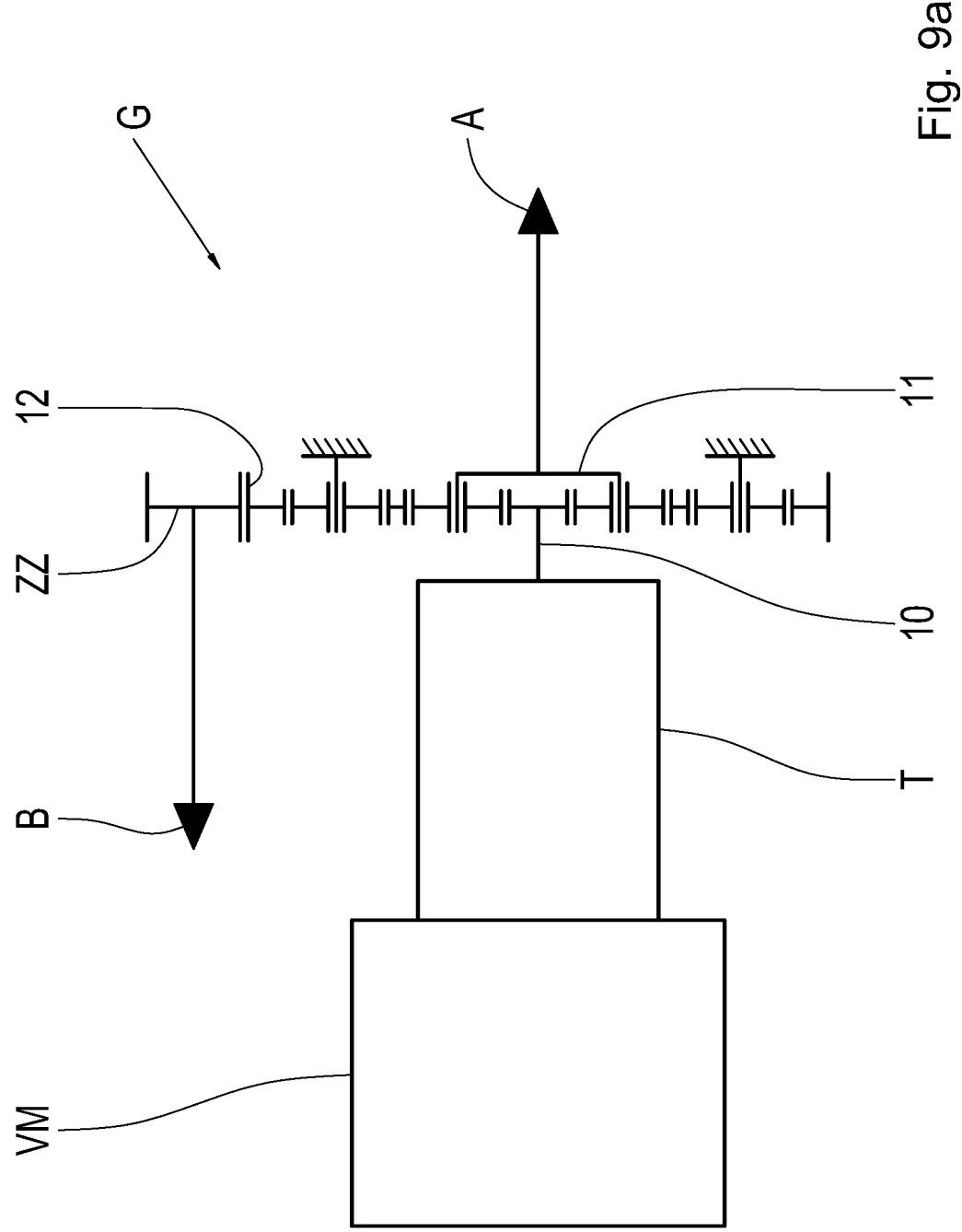

FIG. 9a shows a concrete embodiment of the transmission G for the drive train in FIG. 1c. The drive 12 transfers the torque to the rear axle A. The drive 11 transfers the torque to the front axle B. As can be clearly seen, the axes of the output shafts 11, 12 are parallel to one another, but not coaxial. The second output shaft 12 in the second planetary gearset P2 meshes with an intermediate gearwheel ZZ, which in turn is connected to a shaft, which then inputs the torque to a rear axle differential, not shown.

Figure 10:
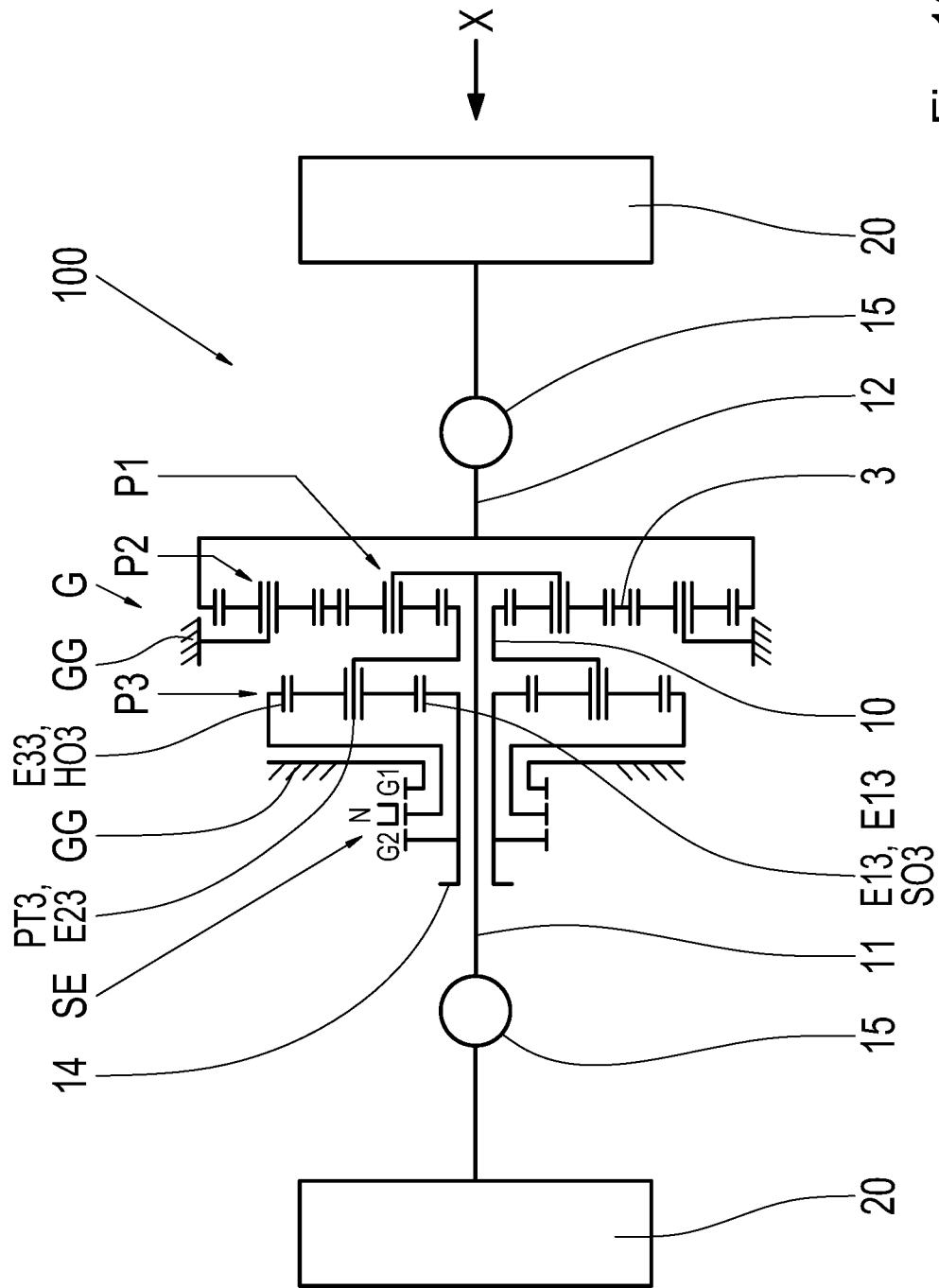
FIGS. 10-13 each show a schematic view of a transmission as it can be used in the motor vehicle drive train shown in FIG. 1, in each case in a preferred embodiment.

FIG. 10 shows a drive train 100 for a vehicle that has a transmission in a preferred embodiment, wherein there is also a step-up transmission in the form of a planetary gearing P3 upstream of the transmission G.

The transmission G is the embodiment shown in FIG. 3, to which reference is made here. The planetary gearset P3 is a negative planetary gearset, and has a first element E13 in the form of a sun gear, a second element E23 in the form of a planet carrier, and a third element E33 in the form of a ring gear HO3. The second element E23 in the third planetary gearset is connected to the input shaft 10 in the transmission G for conjoint rotation.

Furthermore, the third planetary gearing P3 has a dedicated a shifting element SE. The shifting element SE is configured to fix the third element E33 in place on the non-rotating component GG. The shifting element SE is also configured to connect the third element E33 to the first element E13 in the third planetary gearset, i.e. to lock it thereto, when it is in a second shifting position. If a planetary gearset is locked in place, the gear ratio is always 1, regardless of the rotational rate. In other words, the planetary gearset rotates as a block. In a third shifting position, the third element E33 is neither fixed in place on the housing, nor is the third planetary gearset P3 locked in place. The shifting element SE is in a neutral setting in this case. The first shifting setting of the shifting element SE is indicated by the reference symbol G1, which also represents a first gear. The second shifting setting is indicated by the reference symbol G2, which also represents a second gear. The first element E13 in the third planetary gearset P3 is connected to a drive machine, not shown, via an input shaft 14. If the shifting element SE is in the neutral setting, the drive torque input to the step-up transmission P3 is not transferred to the input shaft 10 in the transmission G.

As can also be readily derived from FIG. 10, the step-up transmission P3 is coaxial to the input shaft 10 and the output shafts 11, 12. It can also be readily seen how the first output shaft 11 passes through the hollow input shaft 10 and through the other hollow shaft 14. The two output shafts 11, 12 are each connected to a drive wheel 20. There are constant-velocity joints 15, which enable wheel movements such as steering movements and/or spring compressions. The shifting element SE in this case is a form-fitting double-shifting element. Single-shifting elements, in particular load-shifting elements are also conceivable.

Figure 11:
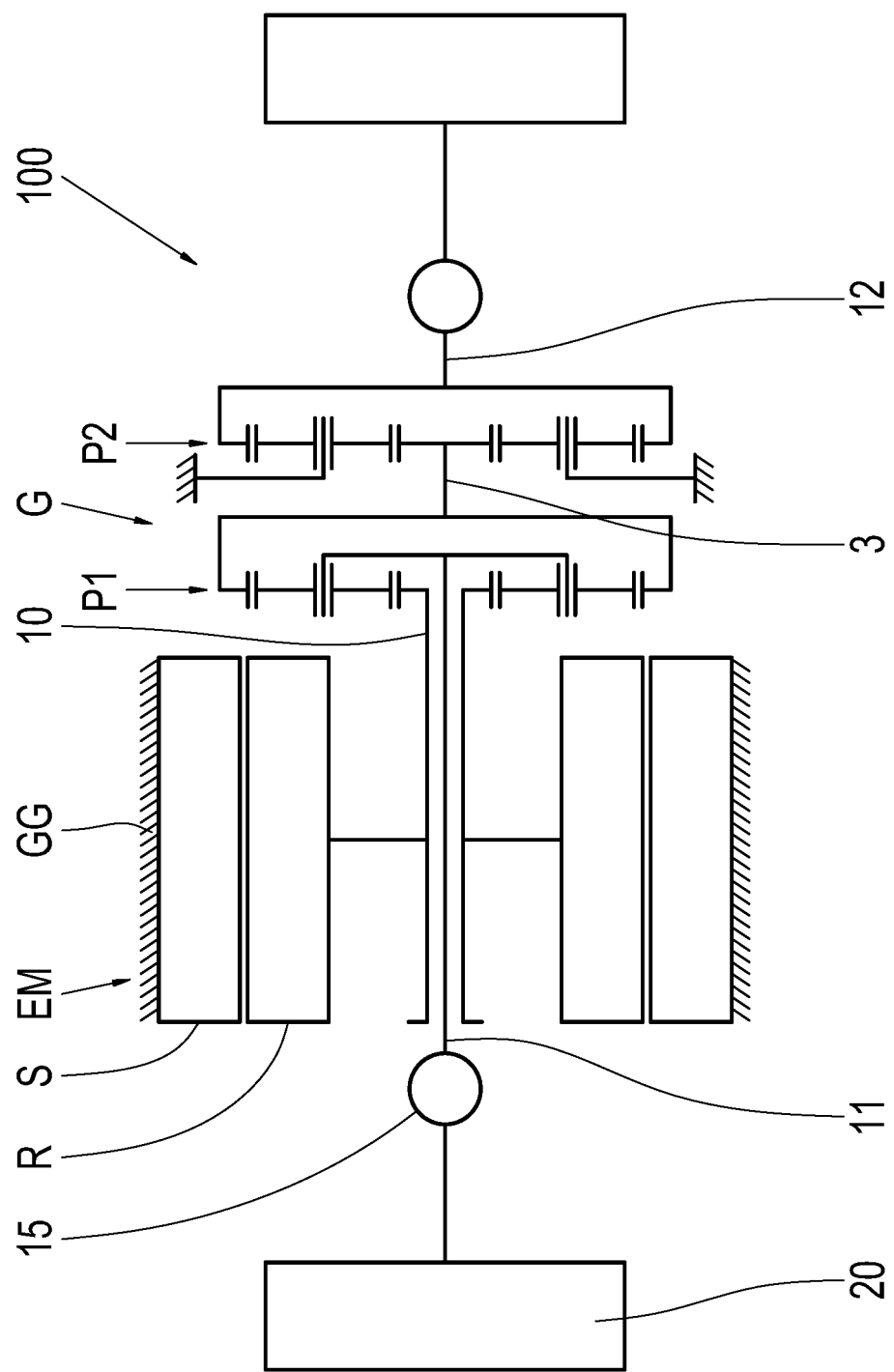

FIG. 11 shows a drive train in a vehicle that has a transmission according to the invention in another preferred embodiment. The transmission G is the preferred embodiment shown in FIG. 2, to which reference is made. Unlike in FIG. 10, there is no upstream step-up transmission in FIG. 11. The drive machine is in the form of an electric machine EM. The electric machine EM has a stator S and a rotor R in the housing. The rotor R is connected to the input shaft 10 for conjoint rotation. The electric machine EM is coaxial to the input shaft 10 and the output shafts 11, 12, as can be readily seen. It is therefore also coaxial to the planetary gearsets P1, P2. The input shaft 10 is hollow, and the first output shaft 11 passes through it. Otherwise, reference is made to the explanations regarding FIG. 10.

Figure 12:
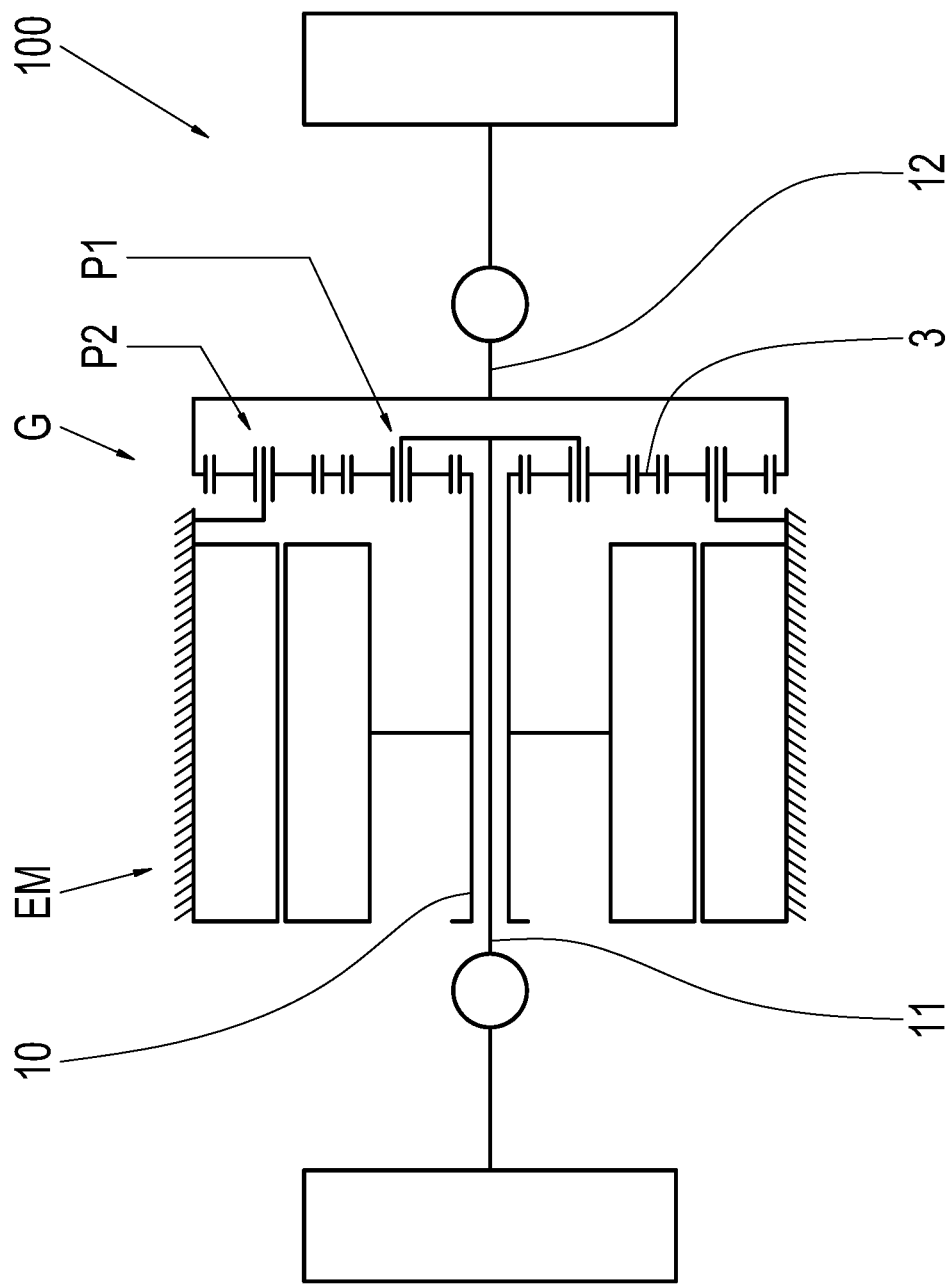

FIG. 12 shows another drive train 100 with a transmission G in a preferred embodiment. Unlike the embodiment in FIG. 11, the planetary gearsets P1, P2 are not axially adjacent to one another, but instead radially above one another, i.e. nested. The transmission G is therefore the preferred embodiment shown in FIG. 3. Otherwise, reference is made to the explanations regarding FIG. 11 and FIG. 3.

Figure 13:
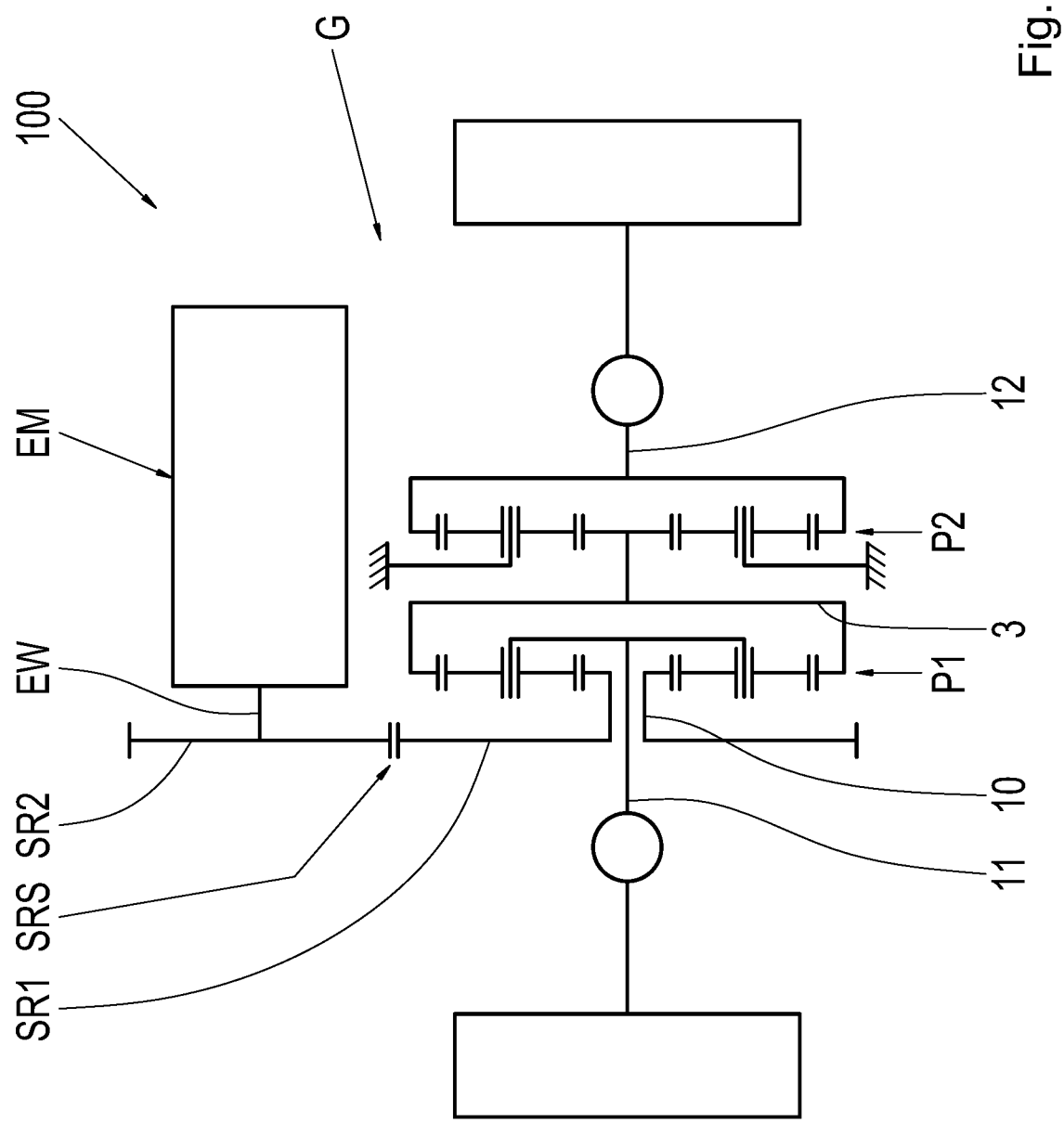

FIG. 13 shows a drive train 100 in another preferred embodiment. The embodiment is similar to that in FIG. 11, but the axis of electric machine EM in this embodiment is parallel to that of the transmission G, instead of coaxial. A connection is obtained in this case via a spur gear stage SRS, composed of a first spur gear SR1 and a second spur gear SR2. The first spur gear SR1 meshes with the second spur gear SR2, which is placed on an input shaft EW in the electric machine EM for conjoint rotation, which then establishes the connection to the rotor, not shown, in the electric machine EM.

Otherwise, the embodiment in FIG. 13 corresponds to that in FIG. 11, such that reference is made to the explanations in this regard.

Figure 14:
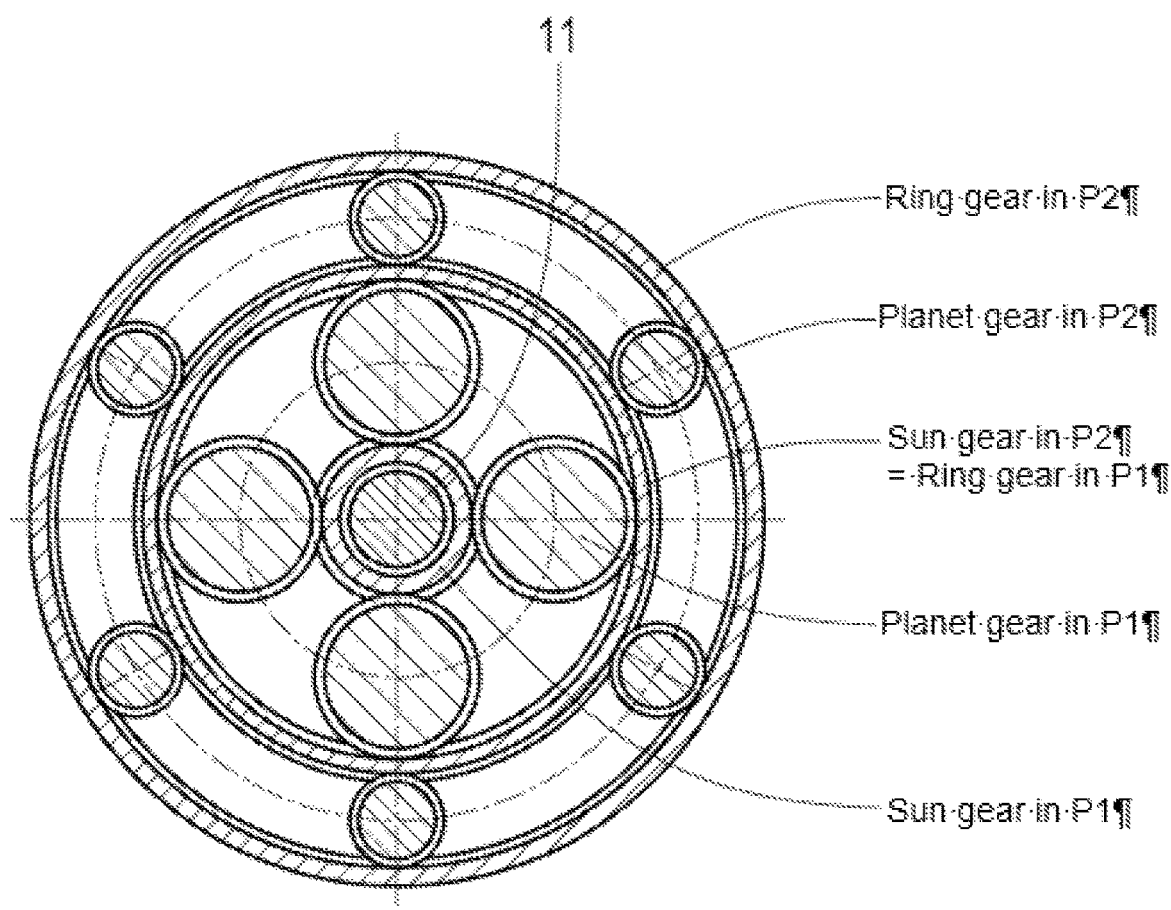
FIG. 14 shows the embodiment shown in FIG. 3 in a cutaway view.

FIG. 14 shows the preferred embodiment of the transmission G shown in FIG. 3, in a cutaway view. The shaft in the middle is the output shaft 11. The input shaft 10 coincides with the sun gear in P1 in this drawing, i.e. the input shaft 10 is connected to a sun gear in the first planetary gearset P1. The sun gear in the first planetary gearset P1 meshes in turn with the planet gears in the first planetary gearset P1. The planet gears in the first planetary gearset P1 mesh in turn with the encompassing ring gear in the first planetary gearset P1, and the ring gear also forms the sun gear for the second planetary gearset P2. The sun gear for the second planetary gearset P2 meshes in turn with the planet gears in the second planetary gearset P2. The planet gears in the second planetary gearset P2 mesh in turn with the ring gear for the second planetary gearset P2, which surrounds the planet gears.

As can be readily seen, the number of planets in the second planetary gearset is greater than the number of planets in the first planetary gearset. According to this embodiment, the second planetary gearset has six planets, and the first planetary gearset has only four planets.

A large transmission gear ratio can be obtained with this configuration, which in turn makes it possible to obtain a particularly compact and cost-effective electric machine.

A large transmission gear ratio results in a smaller standard transmission gear ration at the second planetary gearset P2 according to the calculation rule:

$$i\_02 = 1/i\_01 - 1$$

A smaller standard transmission gear ratio results in turn in a small planet diameter. A smaller planet diameter worsens the meshing of the teeth, in turn, and reduces the installation space for the planet carrier.

It has proven to be the case that a higher number of planets in the second planetary gearset than in the first planetary gearset counteracts this.

Figure 15:
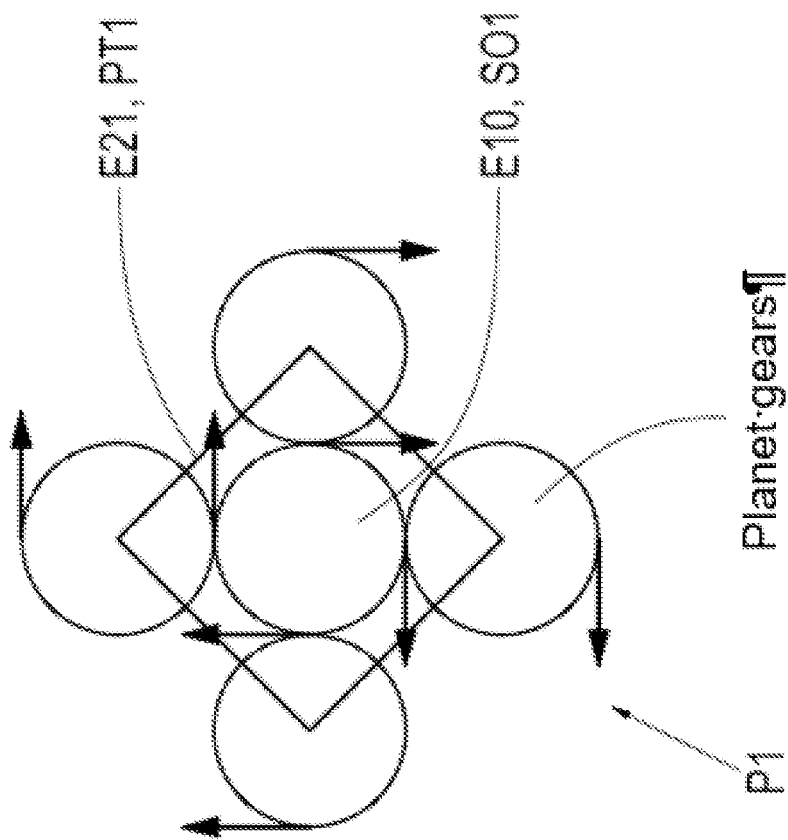
FIGS. 15-18 show a schematic illustration of the functional principle of the invention.
Figure 15:
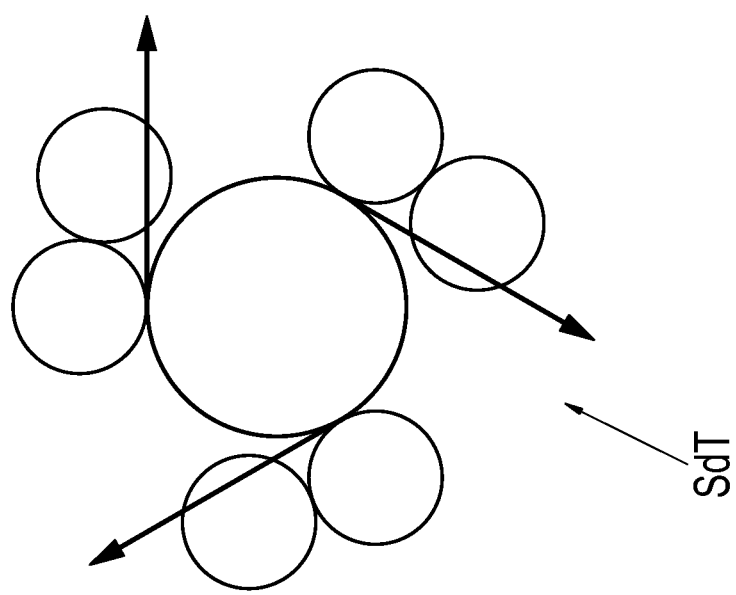
Figure 16:
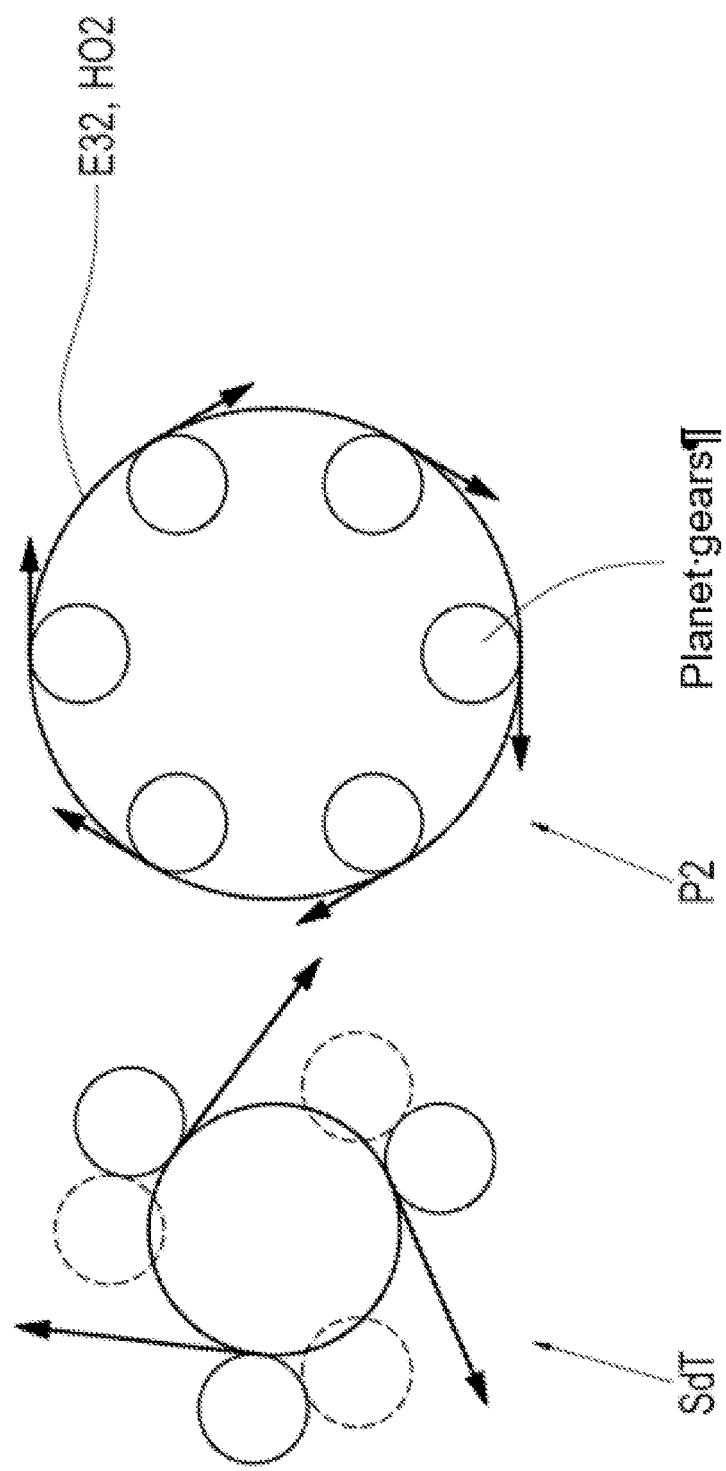
Figure 17:
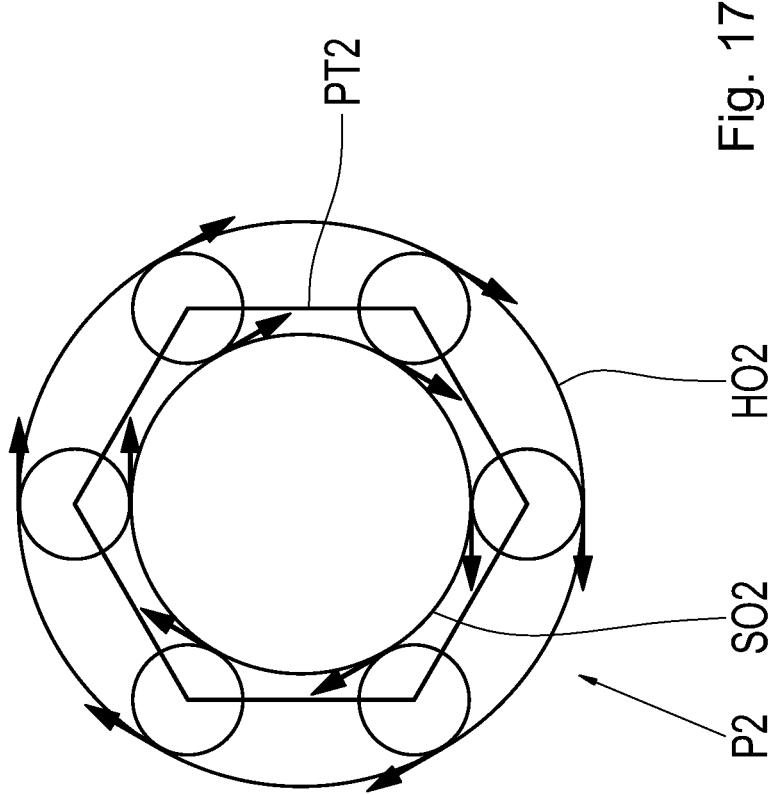
Figure 17:
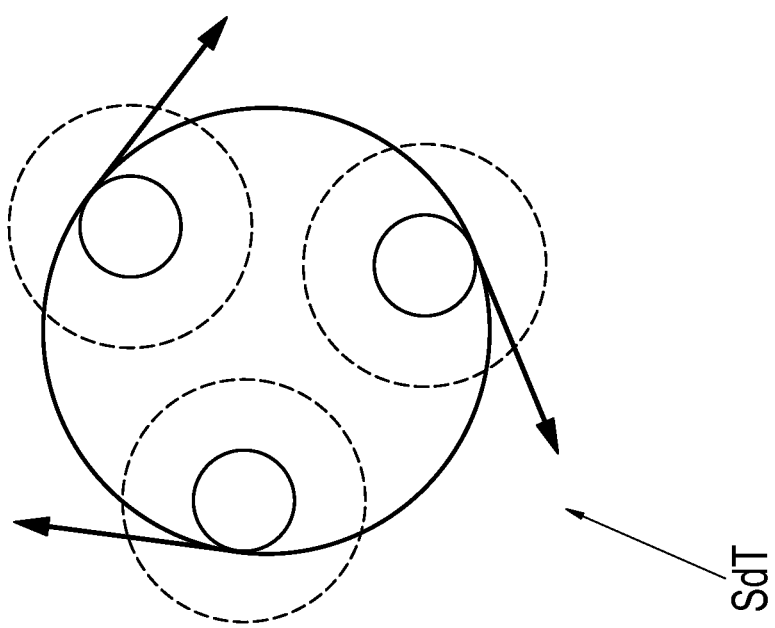

The following FIGS. 15 to 17 show the force inputs and force supports of the invention in comparison with the prior art, e.g. DE 10 2011 079 975 A1. The prior art is compared with the preferred embodiment that has two negative planetary transmissions, such as those described in reference to FIGS. 2 and 3. This also applies analogously to the other embodiments.

The following applies in general for the FIGS. 15 to 17:

The torque of the input shaft 10 is converted to the drive torque for the first output 11 at the first planetary gearset P1. The third element E31 in the first planetary gearset P1 (which is also the first element E12 in the second planetary gearset P2), is driven backward by its reaction torque. The reverse movement of the third element E31 is allowed, such that a part of the mechanical drive power (preferably 50% in the transverse differential and when travelling in a straight line) is conducted through the first planetary gearset P1 into the second planetary gearset.

Furthermore, the ratio to the first output 11 is increased by the reverse rotation (standard transmission ratio i0=−3 would only enable a ration of i=4 if the ring gear is stationary).

In the second planetary gearset P2, the direction of rotation (backwards) introduced at the first element E12 is reversed (forwards) in the output movement of the second output 12 with the aid of a housing bracing E22. In this case, the torque input to the second planetary gearset P2 is combined with the torque output to the second output 12 to obtain the housing bracing torque. The second planetary gearset P2 only transfers the part of the mechanical power that is conducted to the second output 12 (typically 50%) in this case. The second planetary gearset P2 is only subjected to a part of the power, such that there is a positive effect on the overall efficiency.

A torque conversion normally takes place in the prior art with the aid of a housing bracing. The reaction torque of the step-up transmission is then conducted directly into the housing, and is not used to generate the second output torque. The result is that a gearing must first be configured for the combined torques of the two output shafts (normally twice the torque). A separate differential is subsequently needed to distribute this combined torque into two output torques, which is not needed anywhere in this form.

The individual FIGS. 15 to 18 concretely show:

FIG. 15 schematically shows the first planetary gearset P1 of the transmission G (on the right) and a first stage of the spur gear differential from the prior art (on the left). The power input from the planet gears to the sun gear is in parallel, via 3 stationary, i.e. fixed, gear meshings. The output to the first output shaft takes place via the sun gear.

In contrast thereto, the power input according to the preferred embodiment takes place in parallel via eight moving, i.e. rotating gear meshings. There are four gear meshings between the sun gear SO1 and four planet gears. Four other gear meshings act between a respective planet gear and the ring gear HO1, not shown. The output to the first output shaft 11 takes place via the planet carrier PT1. The technological effect lies in the clearly lower gear forces acting on the first planetary gearset.

FIG. 16 schematically shows the second planetary gearset P2 in the transmission G (on the right) and a second stage of the stepped planets from the prior art (on the left). The power input from the planet gears to the sun gear takes place in parallel via 3 stationary, i.e. fixed gear meshings. The output to the second output shaft takes place via the sun gear.

In contrast thereto, the power input to the second planetary gearset P2 according to the preferred embodiment takes place in parallel via 6 moving, i.e. rotating gear meshings. The six gear meshings each act between one of the six planet gears and the ring gear HO2. The fixed planet carrier PT2, which supports the six planet gears and the sun gear SO2 is not shown. The output to the second output shaft 12 takes place via the ring gear HO2. The technological effect lies in the clearly lower gear forces that act on the second planetary gearset due to the greater effective diameter and due to the greater possible number of planets.

FIG. 17 schematically shows the input of the bracing torque to the housing. The power input in the stepped planets according to the prior art (on the left) takes place via 3 parallel gear meshings in a stationary ring gear.

The power input according to the preferred embodiment takes place via 12 parallel gear meshings in the stationary planet carrier PT2. Six gear meshings act between the sun gear SO2 and the six planet gears in the second planetary gearset. The six other gear meshings act between each planet gear in the second planetary gearset and the ring gear HO2. The technological effect lies clearly in the lower gear forces acting on the second planet carrier PT2.

Figure 18:
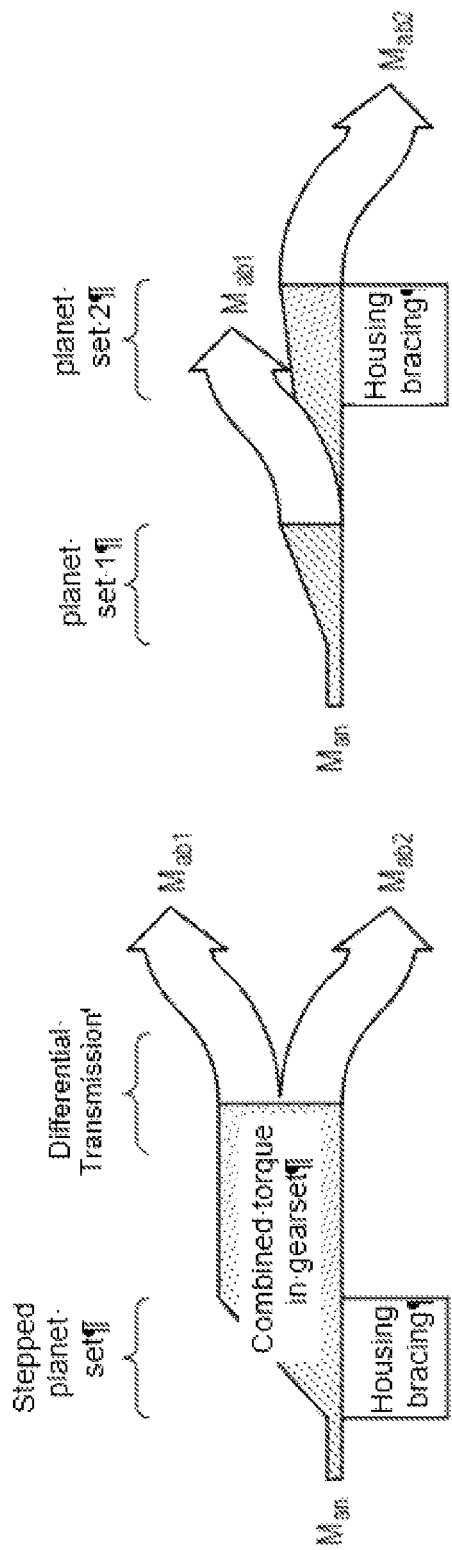

FIG. 18 shows the principle shown in greater detail in FIGS. 15 to 17, in another view.

The greatest torque in the gearset according to the invention (on the right) corresponds to the output torque for a single wheel. Only the housing bracing has a higher torque factor according to the physical laws.

The stepped planet set according to the prior art (on the left) generates the entire output torque from an input torque Man, i.e. the combined torque for both wheels. The differential divides this high torque into two half wheel torques Man1 and Man2.

The torques are shown symbolically on their path through the transmission in the illustration. The directions of rotation cannot be derived therefrom.

FIG. 19 shows an overview of the calculation rule for the standard transmission gear ratios of the individual embodiments. These each result in the same output torque, ignoring transmission losses, with the same sign, at both output shafts 11, 12. i01 stands for the standard transmission ratio for the first planetary gearset P1. i02 stands for the standard transmission ratio for the second planetary gearset P2. Depending on the use of the transmission, one of the planetary gearset configurations can be selected with a corresponding standard transmission gear ratio.

FIGS. 20 to 26 show the shifting element 40 according to the invention, which is located between the first and second output shafts 11, 12. The transmission gearset used in FIGS. 20 to 26 corresponds to that transmission gearset known from FIGS. 3 and 12. This is the embodiment in which the first and second planetary gearsets P1, P2 are placed radially above one another. At this point it should be noted that the shifting element 40 between the output shafts 11, 12 can be used with any of the embodiments in the FIGS. 2 to 13.

Figure 20:
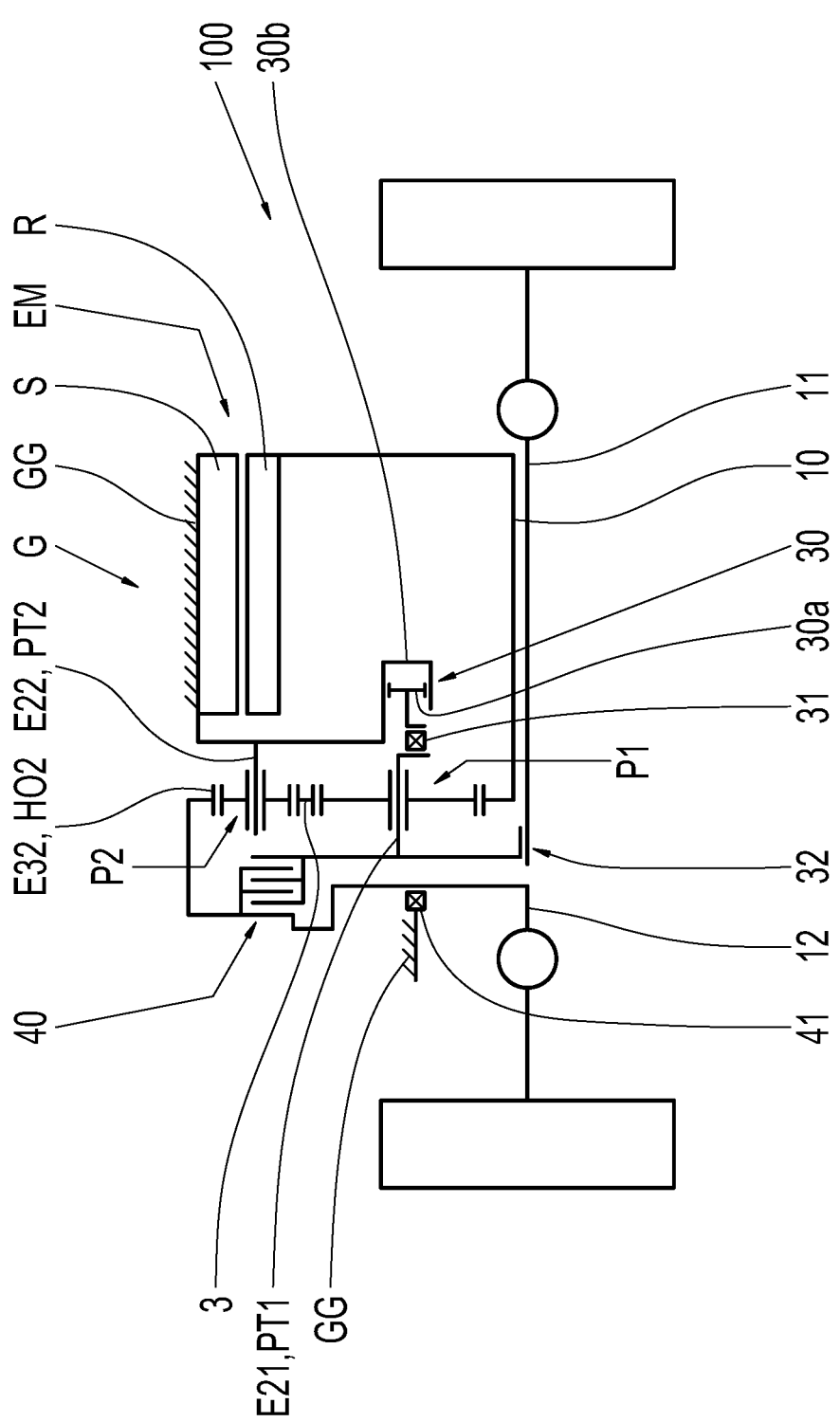
FIGS. 20-26 show preferred embodiments of the shifting element, in reference to the transmission in FIG. 3, by way of example.

Regarding the transmission G shown in FIG. 20, reference is made to the explanations relating to the embodiment in FIG. 3. Regarding the connection of the electric machine EM to the input shaft 10, reference is made to the explanations relating to FIG. 12.

The transmission G comprises an actuator unit 30, which contains an actuator in the form of a hydraulic piston 30*a* and a hydraulic cylinder 30*b*. The hydraulic piston 30*a* is guided in the known manner in the hydraulic cylinder 30*b*, and is configured to exert a force on the second element E21, i.e. the planet carrier PT1 in the first planetary gearset P1. The planet carrier PT1 has no axial forces with regard to the meshing forces acting on it, and can move axially 32. If the hydraulic piston 30*a* exerts a force on the planet carrier PT1, the force of the hydraulic piston 30*a* is input via the shifting element 40 in the form of a multi-disk shifting element into a connecting element between the third element E32, i.e. the ring gear HO2 in the second planetary gearset P2, and the second output shaft 12. The flow of force is then closed via a further bearing 41, via the housing GG.

The shifting element 40 is located axially between the ring gear E32 and a connecting element, which conducts torque from the ring gear E32 to the second output shaft 12.

In addition to the forces from the actuator unit 30, forces from the helical gearing on the elements E11 and E32 can also act on the friction clutch 40. The housing bearing 41 on the left, which can also be referred to as a reaction bearing, is also preferably used to absorb other forces, such as meshing forces and drive shaft forces. The bearing 41 can also be in the form of a fixed bearing.

Figure 21:
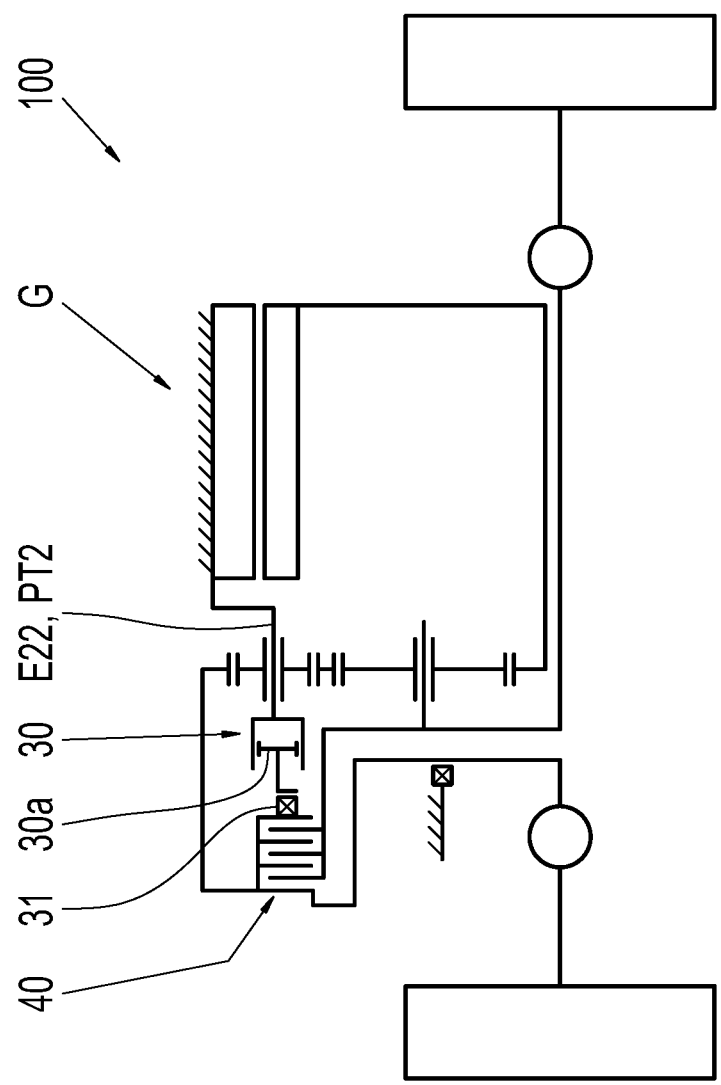

In the embodiment in FIG. 21, the hydraulic piston 30*a* in the actuator unit 30 is attached to the second element E22, i.e. the planet carrier PT2 in the second planetary gearset P2, or it is an integral part thereof.

When the hydraulic piston 30*a* is actuated, a force is transferred from the hydraulic piston 30*a* to the shifting element 40 via the indent bearing 31. The force then flows via the shifting element 40 into the reaction bearing 41 and is thus returned to the housing GG. Axial movement of the planet carrier PT1 in the first planetary gearset P1 is therefore not necessary. In other words, there is no need for the bearing 32 in FIG. 20.

Figure 22:
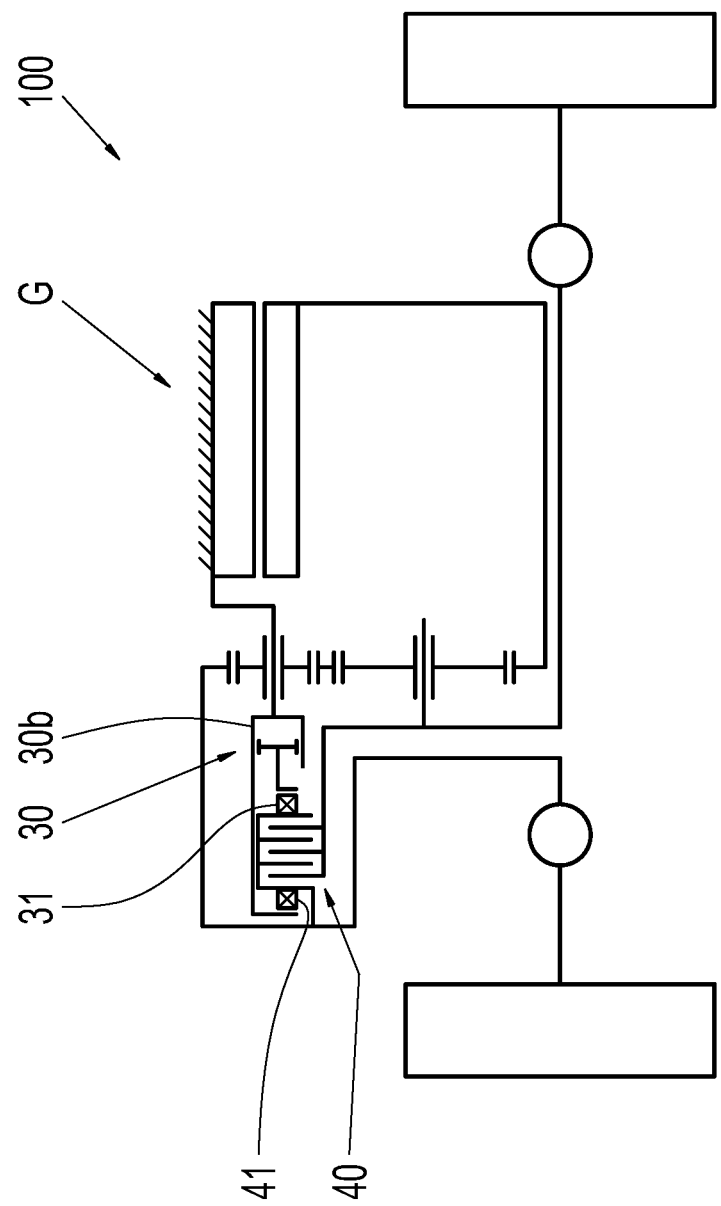

The embodiment according to FIG. 22 differs from that in FIG. 21 in that the bearing 41 is placed near the hydraulic cylinder 30*b*, such that the actuation force is conducted directly from the indent bearing 31 via the shifting element 40 and via the bearing 41 back into a component 30 on the housing GG. As a result, it is not necessary to guide the actuation force in the housing GG outside, around the planetary gearsets P1, P2 and the shifting element 40.

Figure 23:
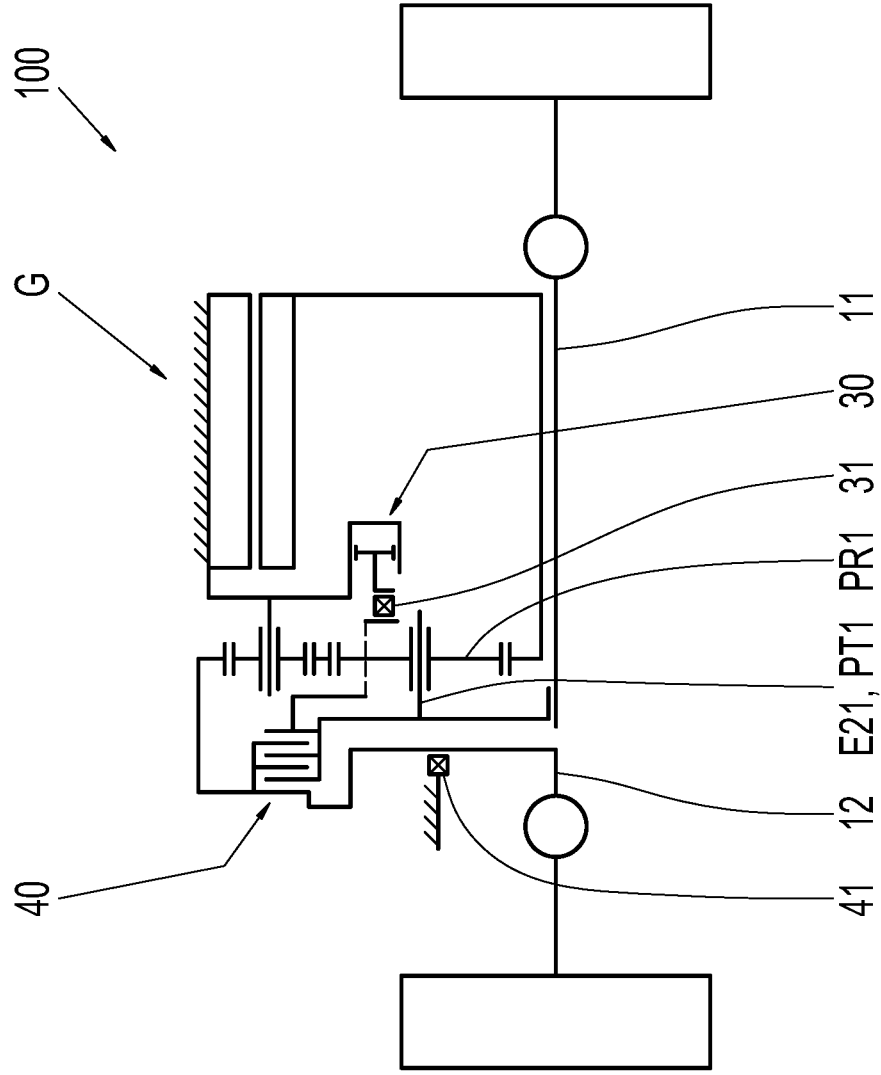

In the embodiment in FIG. 23, the axial force from the hydraulic piston 30*a* is conducted from the actuator unit 30 in the housing via an axial bearing 31 into a transfer element 37 that rotates conjointly with the first output shaft 11. The transfer element 37 is indicated by a broken line, and passes through the first planetary gearset P1. It is configured to transfer the axial force Because the transfer component 37 rotates conjointly with the output shaft 11 and therefore with the planet carrier PT1 in the first planetary gearset P1, it is possible to pass radially between the sun gear SO1 and the ring gear HO1 in the first planetary gearset P1 and reach circumferentially between the individual planet gears PR1, in order to conduct the actuation force to the shifting element 40. The force flow in the embodiment according to FIG. 20 is closed.

Figure 24:
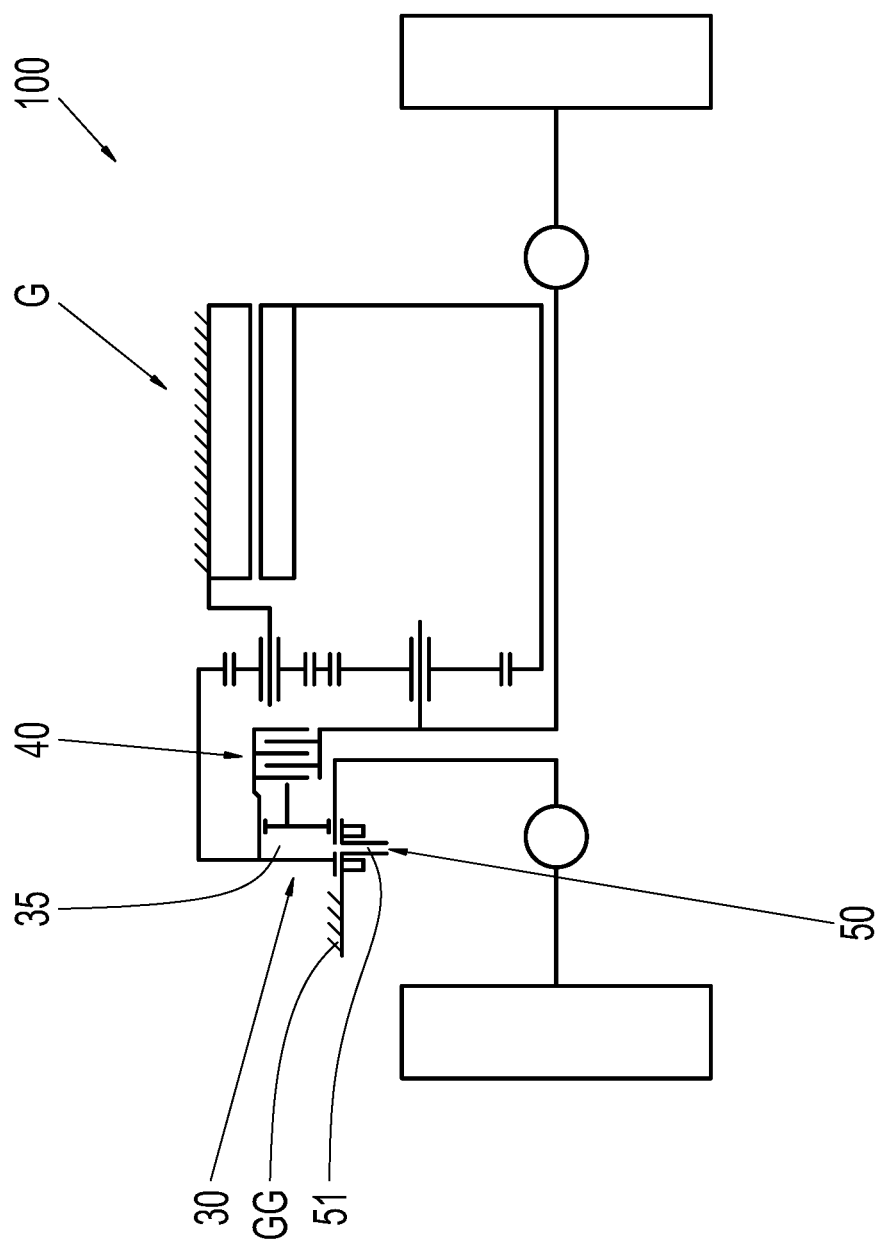

The embodiment in FIG. 24 differs from the embodiment in FIG. 23 in that the hydraulic piston 30a rotates conjointly. The hydraulic piston 30b is connected to the second output shaft 12 for conjoint rotation. The friction clutch 40 is therefore actuated by the conjointly rotating hydraulic piston 30a. An actuation pressure is obtained for this via a fluid supply 50 in the housing, flowing through a rotating fluid supply line 51 sealed by sealing rings, into a cylinder chamber 35 in the hydraulic cylinder 30b. The force flow is also closed in this embodiment, as in FIG. 22, along the "shortest path," without involving the housing GG. There is also no need for an indent bearing or reaction bearing.

Figure 25:
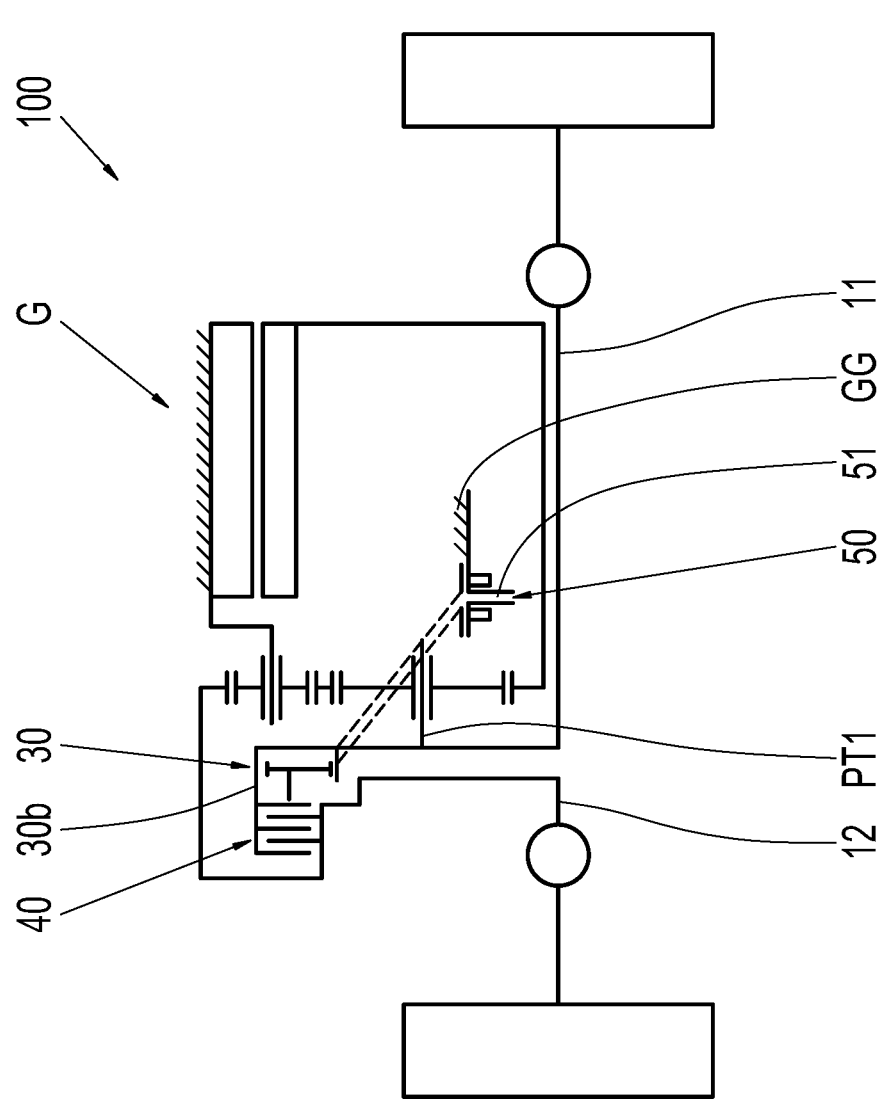

In the embodiment in FIG. 25, unlike the embodiment in FIG. 24, the hydraulic cylinder 30b is connected to the first output shaft 11 for conjoint rotation. The hydraulic cylinder 30b thus rotates conjointly with the first output shaft 11. The supply of pressure fluid 50 is then ideally through the planet carrier PT1 in the first planetary gearset P1. I.e. the fluid supply line 51 passes at least in part axially through the first planetary gearset P1. This passage through the first planetary gearset P1 is indicated by a broken line in FIG. 25.

Figure 26:
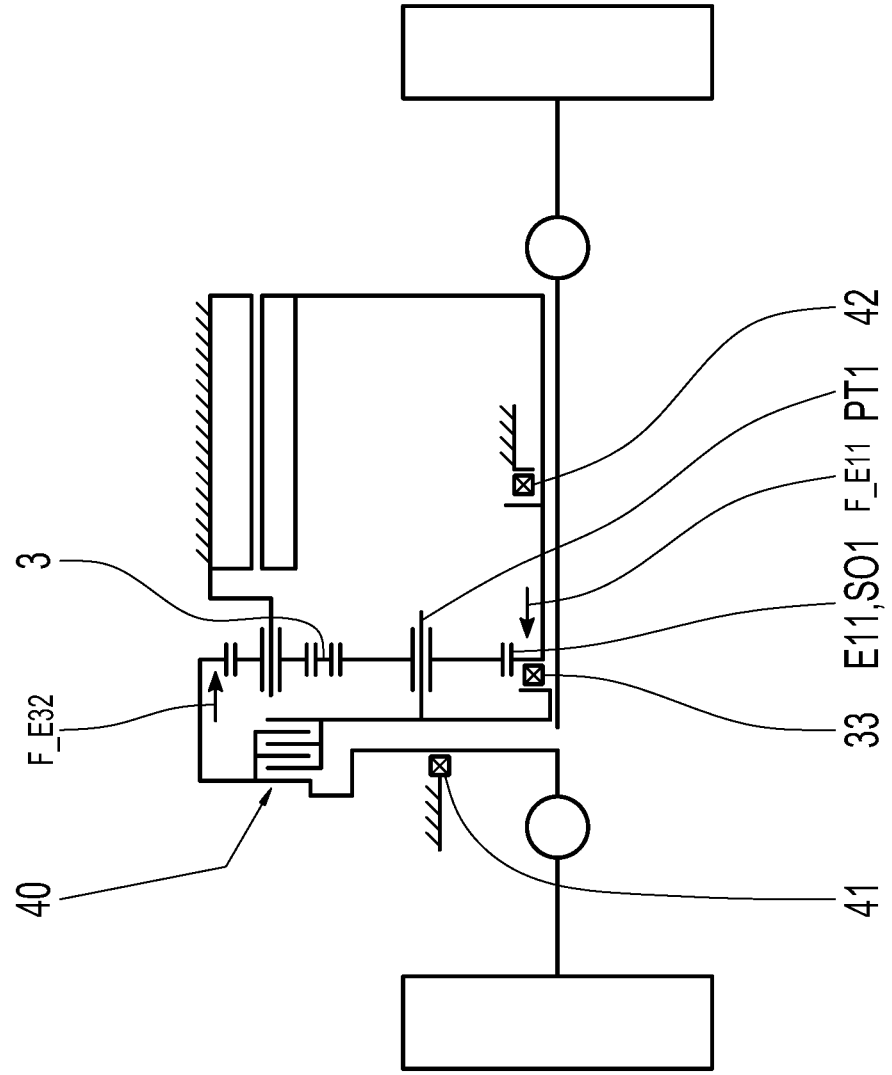

In the embodiment in FIG. 26, in addition to the force from the actuator 30a, not shown, forces from the helical gearing of the sun gear SO1 and the ring gear HO2 are conducted via the shifting element 40 in order to obtain an additional friction torque there. The advantage is that the necessary actuation force is lower, because the force from the helical gearing adds a compression force component, which is proportional to the drive torque. Furthermore, the shifting element is consequently engaged in normal operation, and therefore has a shorter reaction time. Furthermore, the shifting element 40 has a self-locking effect that is proportional to the torque. This enables a first quick reaction by the shifting element 40, which occurs prior to an electronic element for actuating the actuator unit 30, and/or the actuator unit 30 itself, can generate the actual locking torque.

The axial forces F_E11 and F_E32 formed in the helical gearings are shown in FIG. 26. The pitches of the teeth on the shaft 3 are preferably selected such that the axial forces from the ring gear HO1 and the sun gear SO2 are also compensated for, and the shaft 3 itself is therefore axially balanced. The axial forces F_E11, F_E32 are therefore the only notable forces acting outwardly on the planetary gearsets P1 and P2. The directions of pitch are selected such that the directions of the arrows in the traction mode indicate the forward direction.

The axial force F_E11 in the helical gearing in the sun gear SO1 presses against the planet carrier PT1 via a bearing 33. The axial force F_E32 in the helical gearing in the ring gear HO2 pulls against the second output shaft 12. The second output shaft 12 is braced against the planet carrier PT1 via the shifting element 40.

In other words, the forces F_E11 and F_E32 counterbalance each other. This means that the forces from the helical gearing do not need to be conducted via the transmission housing in the more frequent case of the traction mode. As a result, the axial force of the helical gearing is transferred via the shifting element 40. Consequently, in the forward traction mode (and in the reverse motor braking), a load-dependent compression force, proportional to the torque, of the shifting element 40 is obtained, thus resulting in a load-dependent locking torque. The flow of force of the axial forces dependent on the helical gearing is closed via the friction element in the shifting element 40.

The advantage of this concept, in addition to the locking effect being proportional to the torque, is in the low bearing losses. There is also an advantage in noise reductions, i.e. an acoustic improvement, because the axial forces F_E11, F_E32 of the gearings, and therefore their overlapping axial vibrations, are not conducted into the housing GG.

As long as the actuator 30a is not actuated, the axial bearing 33 is the only bearing that transfers an axial force with a rotational speed difference.

The bearings 41 and 42 facing the housing GG are subjected to forward axial forces (F_E11, F_E32) in the motor braking mode (and reverse, in the traction mode), from the gearing. The bearing 42 has play in the axial direction, such that a floating bearing can be obtained. The bearing 41 also supports the force of the actuator 30a in actuation variations with an indent bearing 31 (FIGS. 20, 21, 22, 23)—also referred in this case as draining off the reaction force—and can likewise be designed as a fixed bearing.

Figure 27:
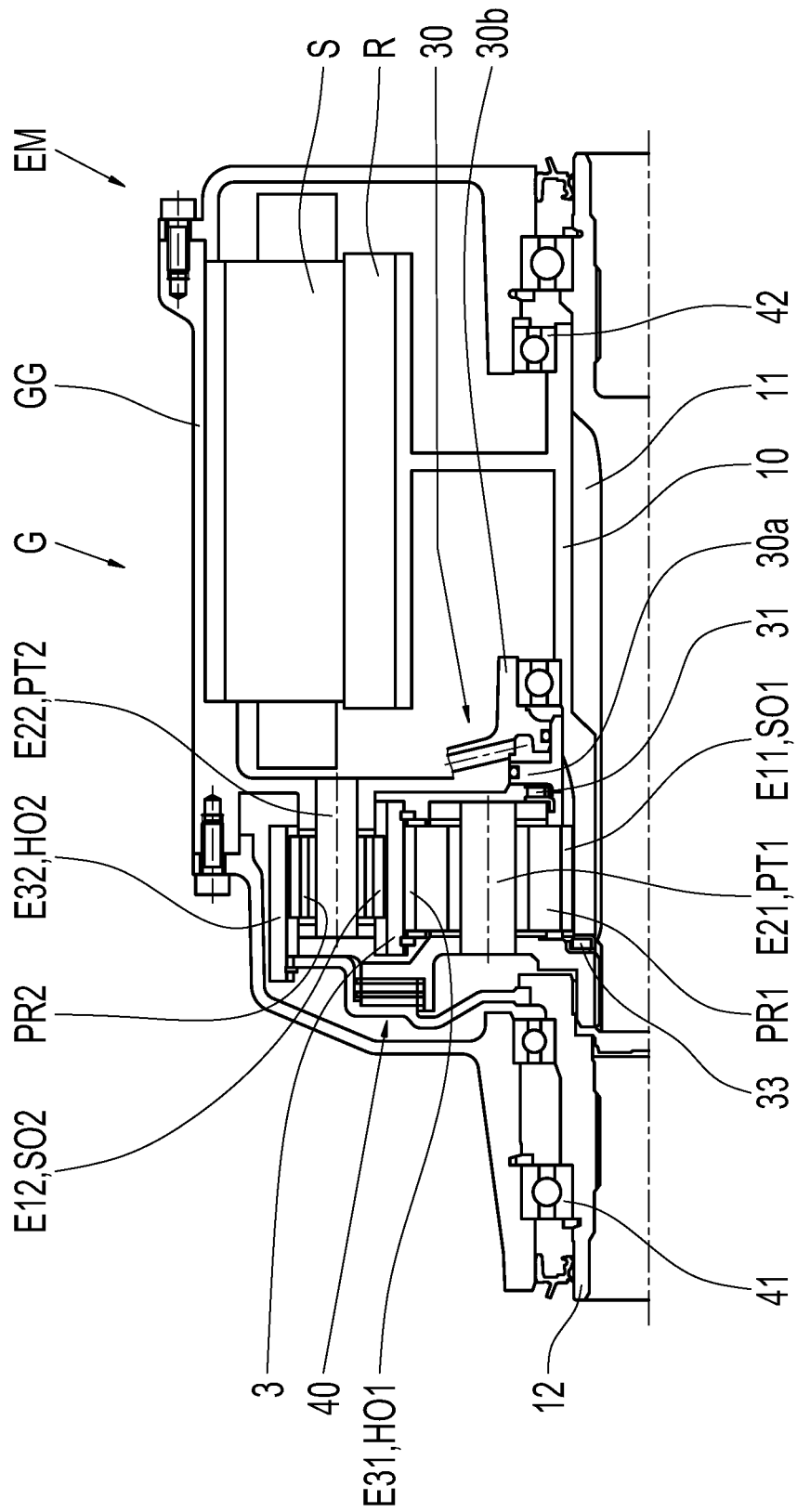
FIG. 27 shows an exemplary design according to FIG. 20.

FIG. 27 shows a diagram of the embodiment in FIG. 20 in a longitudinal section. The hydraulic piston 30a in the housing GG presses against the planet carrier PT1 via an axial bearing 31. The rotor shaft R, or the input shaft 10 connected to the rotor, also presses against the planet carrier PT1 via the axial bearing 33, due to its helical gearing. The combined forces press against the shifting element 40 and generate the locking torque. The fixed bearing 41 at the left of the second output shaft 12 serves as the reaction bearing toward the housing GG. The shifting element 40 has an odd number of friction surfaces, specifically 5 friction surfaces. As a result, there is no need for additional bearings on the shifting element 40.

The invention has been comprehensively described and explained in reference to the drawings and in the description. The description and explanation are to be understood by way of example, and not as limiting. The invention is not limited to the embodiments disclosed herein. Other embodiments or variations can be derived by the person skilled in the art through the use of the present invention, and a precise analysis of the drawings, the disclosure, and the following claims.

The words "comprising" and "with" in the claims do not exclude the presence of other elements or stages. The indefinite articles "a" and "an" do not exclude a plurality. An individual element or an individual unit may execute the functions of numerous units specified in the claims. Simply specifying some measures in numerous different dependent claims is not to be understood to mean that a combination of these measures cannot likewise be used advantageously.

REFERENCE SYMBOLS

G transmission
GG non-rotating component, housing
E11 first element in first planetary gearset
E21 second element in first planetary gearset
E31 third element in first planetary gearset
E12 first element in second planetary gearset E22 second element in second planetary gearset
E32 third element in second planetary gearset
E13 first element in third planetary gearset
E23 second element in third planetary gearset
E33 third element in third planetary gearset
P1 first planetary gearset
P2 second planetary gearset
P3 third planetary gearset
SO sun gear
PT planet carrier
HO ring gear
EM electric machine
S stator
R rotor
EW input shaft in electric machine
SRS spur gear stage
SR1 first spur gear
SR2 second spur gear
SE shifting element
G1 first shifting setting, first gear setting
G2 second shifting setting, second gear setting
N neutral position
VM internal combustion engine
A rear axle on the vehicle
B front axle on the vehicle
3 shaft
10 input shaft
11 first output shaft
12 second output shaft
15 joint
20 wheels
30 actuator unit
30a actuator, hydraulic piston
30b hydraulic cylinder
31 bearing, indent bearing
32 bearing, fixed and axially moving (note: a bearing is normally understood to be not fixed, for which reason the explanation is included here)
33 bearing, axial bearing
35 cylinder chamber
37 transfer component
40 shifting element, multi-disk clutch, friction clutch
41 bearing
42 bearing
50 fluid supply
51 fluid line
99 direction of travel, forward
100 drive train
1000 vehicle
i01 standard transmission gear ratio for the first planetary gearset
i02 standard transmission gear ratio for the second planetary gearset

The invention claimed is:

1. A transmission comprising
an input shaft,
a first output shaft,
a second output shaft,
a first planetary gearset, and
a second planetary gearset connected to the first planetary gearset, wherein the planetary gearsets, wherein
the input shaft is connected to a first element of the first planetary gearset for conjoint rotation,
the first output shaft is connected to a second element of the first planetary gearset for conjoint rotation,
the second output shaft is connected to a third element of the second planetary gearset for conjoint rotation,
a third element of the first planetary gearset is connected to a first element of the second planetary gearset via a shaft for conjoint rotation, and
a second element of the second planetary gearset is fixed in place on a non-rotating component,
wherein a shifting element is disposed and designed to connect the two output shafts to one another in a torque-transferring manner, such that a torque to one of the two output shafts is conducted radially outside the shifting element.

2. The transmission according to claim 1, wherein the shifting element is a clutch.

3. The transmission according to claim 1, wherein the shifting element is located at least partially within at least one of the third element of the second planetary gearset and a connection with the second output shaft.

4. The transmission according to claim 1, including an actuator in the form of a hydraulic piston for actuating the shifting element.

5. The transmission according to claim 4, wherein the hydraulic piston is an integral part of the transmission housing or one of the two second elements.

6. The transmission according to claim 4, wherein the hydraulic piston is rotatable conjointly with one of the two output shafts.

7. The transmission according to claim 6, wherein the hydraulic fluid for actuating the hydraulic piston can pass through a component that rotates conjointly with one of the two output shafts.

8. The transmission according to claim 4, wherein the hydraulic fluid for actuating the hydraulic piston can pass through a hole in one of the two second elements.

9. The transmission according to claim 1, further comprising an electromechanical actuator for actuating the shifting element.

10. The transmission according to claim 9, wherein the electromechanical actuator comprises at least one of a spindle and a ramp.

11. The transmission according to claim 9, wherein the electromechanical actuator comprises a lever.

12. The transmission according to claim 1, wherein an actuator for actuating the shifting element is configured such that an axial force is transferred through one of the two second elements.

13. The transmission according to claim 1, wherein the second element of one of the two planetary gearsets is configured to be axially displaced for transferring the axial force.

14. The transmission according to claim 12, wherein a component for transferring the axial force is disposed and designed to guide the axial force through one of the two second elements.

15. The transmission according to claim 1, wherein the shifting element is a friction clutch, and is configured to transfer forces from a helical gearing as well.

16. The transmission according to claim 1, further comprising a slotted plate spring for reducing bearing forces when the shifting element is actuated.

17. The transmission according to claim 1, wherein the input shaft and/or the first element in the first planetary gearset is supported in a floating manner.

18. The transmission according to claim 1, wherein the second element in the first planetary gearset and/or the third element in the second planetary gearset is supported in a floating manner.

19. The transmission according to claim 1, wherein a pitch of the gearing on the third element in the first planetary gearset and on the first element in the second planetary gearset is substantially the same, and they each have the same sign.

* * * * *